US008074249B2

(12) United States Patent
Shikata et al.

(10) Patent No.: US 8,074,249 B2
(45) Date of Patent: Dec. 6, 2011

(54) CONTENT STORAGE CONTROL APPARATUS AND CONTROL METHOD THEREFOR

(75) Inventors: Yasushi Shikata, Tama (JP); Yoshikazu Shibamiya, Tokyo (JP); Kazuna Maruyama, Fuchu (JP); Kazuhiro Matsubayashi, Yokohama (JP); Koji Mito, Kawasaki (JP); Hirofumi Urabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 754 days.

(21) Appl. No.: 11/872,476

(22) Filed: Oct. 15, 2007

(65) Prior Publication Data

US 2008/0098444 A1    Apr. 24, 2008

(30) Foreign Application Priority Data

Oct. 24, 2006 (JP) .................................. 2006-289198
Aug. 9, 2007 (JP) .................................. 2007-208476

(51) Int. Cl.
*H04N 7/10* (2006.01)
*H04N 7/16* (2011.01)
*H04N 7/025* (2006.01)
*H04N 7/173* (2011.01)

(52) U.S. Cl. .......... 725/110; 725/32; 725/109; 725/112; 725/136; 725/139; 725/142

(58) Field of Classification Search ............... 725/32, 725/109, 110, 112, 136, 139, 142
See application file for complete search history.

(56) References Cited

U.S. PATENT DOCUMENTS

| 5,774,664 | A | * | 6/1998 | Hidary et al. ............... 725/110 |
| 5,818,441 | A | * | 10/1998 | Throckmorton et al. ..... 715/717 |
| 5,845,077 | A | * | 12/1998 | Fawcett ........................ 709/221 |
| 2002/0088004 | A1 | * | 7/2002 | Kitsukawa et al. ........... 725/113 |
| 2002/0184646 | A1 | * | 12/2002 | Lord ............................ 725/109 |

FOREIGN PATENT DOCUMENTS

| JP | 2002-094887 | 3/2002 |
| JP | 2002-215924 | 8/2002 |
| JP | 2004-529588 | 9/2004 |

* cited by examiner

*Primary Examiner* — Dominic D Saltarelli
(74) *Attorney, Agent, or Firm* — Cowan, Liebowitz & Latman, P.C.

(57) ABSTRACT

If there are program-related associated Web pages, a TV receiver 1000 acquires the content information of the associated Web pages from a Web server 2000 and stores it in a Web page storage unit 1006. The correspondence between the stored content information and recorded program is stored in a correspondence information holding unit 1005. The data of the program is outputted to a TV program recorder 3000, where it is recorded. The user can configure the timing, at which the storage of the associated Web pages is carried out.

12 Claims, 22 Drawing Sheets

FIG. 3

| | | CORRESPONDENCE INFORMATION 1 | CORRESPONDENCE INFORMATION 2 | CORRESPONDENCE INFORMATION 3 | |
|---|---|---|---|---|---|
| RECORDED PROGRAM INFORMATION | SERVICE NAME | SERVICE A | SERVICE B | ... | ... |
| | PROGRAM START DATE AND TIME | 2006/02/17/13:00:00 | 2006/02/18/18:00:00 | ... | ... |
| | PROGRAM TITLE | PROGRAM X | PROGRAM Y | ... | ... |
| | RECORDING STATUS | COMPLETED | SCHEDULED | ... | ... |
| STORED WEB PAGE INFORMATION | URL | http://toy.com/sport.html | http://dramadrama.jp/drama.html | ... | ... |
| | STORAGE TIME | 2006/02/17/12:58:00 | 2006/02/18/12:58:00 | ... | ... |
| | STORAGE LOCATION | /usr/web/060217/no1/... | null | ... | ... |
| | STORAGE STATUS | COMPLETED | SCHEDULED | ... | ... |

F I G. 4
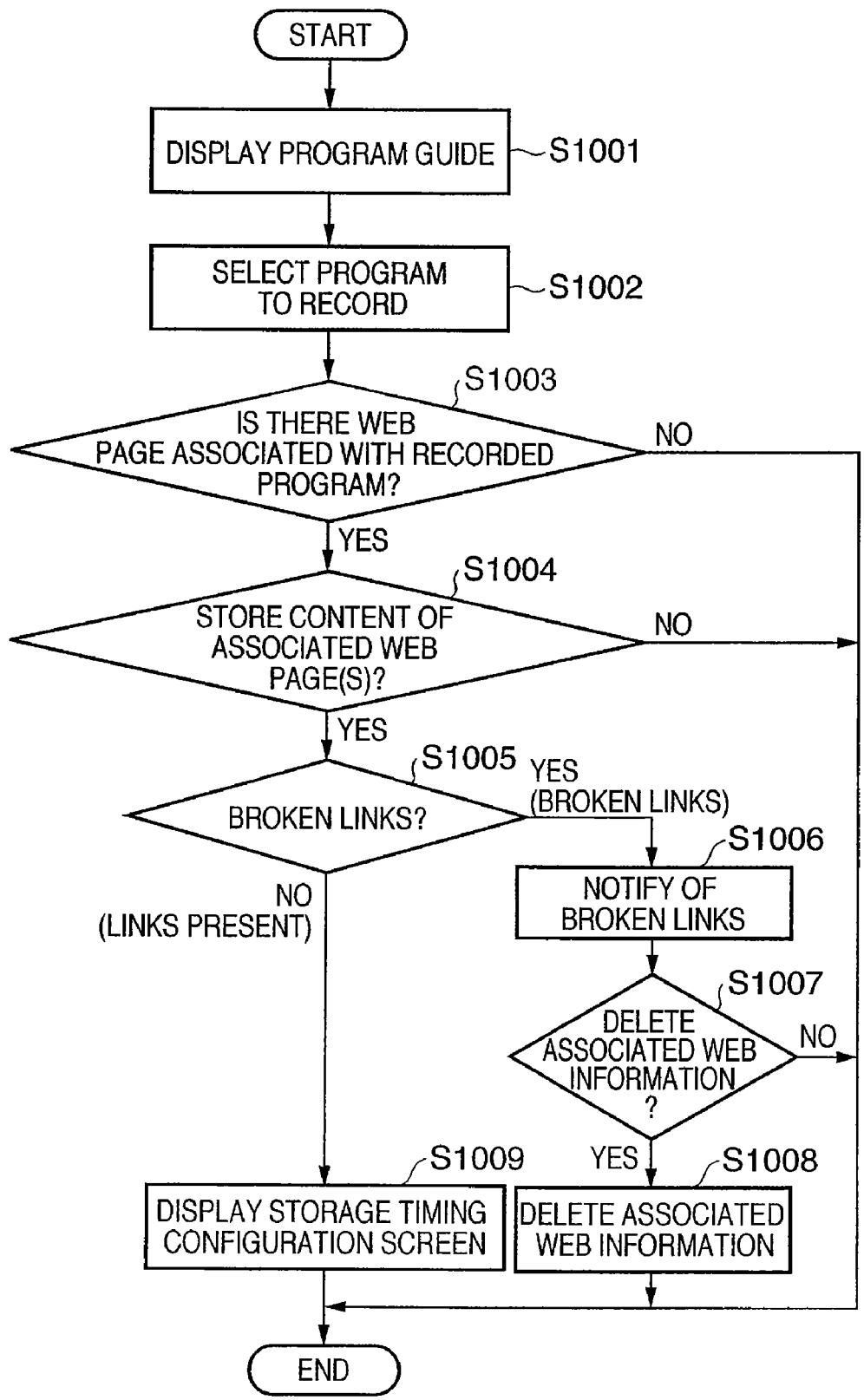

F I G. 17

| | CORRESPONDENCE INFORMATION 1 | CORRESPONDENCE INFORMATION 2 | CORRESPONDENCE INFORMATION 3 | |
|---|---|---|---|---|
| RECORDED-PROGRAM INFORMATION | SERVICE NAME | SERVICE A | SERVICE B | ..... |
| | PROGRAM START TIME | 2006/02/17/13:00:00 | 2006/02/18/18:00:00 | ..... |
| | PROGRAM TITLE | PROGRAM X | PROGRAM Y | ..... |
| | RECORDING STATUS | COMPLETED | SCHEDULED | ..... |
| STORED WEB PAGE INFORMATION | URL | http://toy.com/sport.html | http://dramadrama.jp/drama.html | ..... |
| | STORAGE STATUS | COMPLETED | SCHEDULED | ..... |
| | AUTOMATIC STORAGE | EVERY 10 MIN | NONE | |
| | UPDATE FREQUENCY | 3 | 0 | |
| | CONTENT 1 STORAGE DATE & TIME | 2006/02/17/12:58:00 | 2006/02/18/12:58:00 | ..... } REPEAT DEPENDING ON |
| | STORAGE LOCATION | /usr/web/060217/no1/no1-1 | null | ..... |
| | CONTENT 2 STORAGE DATE & TIME | 2006/02/17/13:05:00 | null | ..... |
| | STORAGE LOCATION | /usr/web/060217/no1/no1-2 | null | ..... |
| | ⋮ STORAGE DATE & TIME | ..... | ..... | |
| | STORAGE LOCATION | ..... | ..... | |

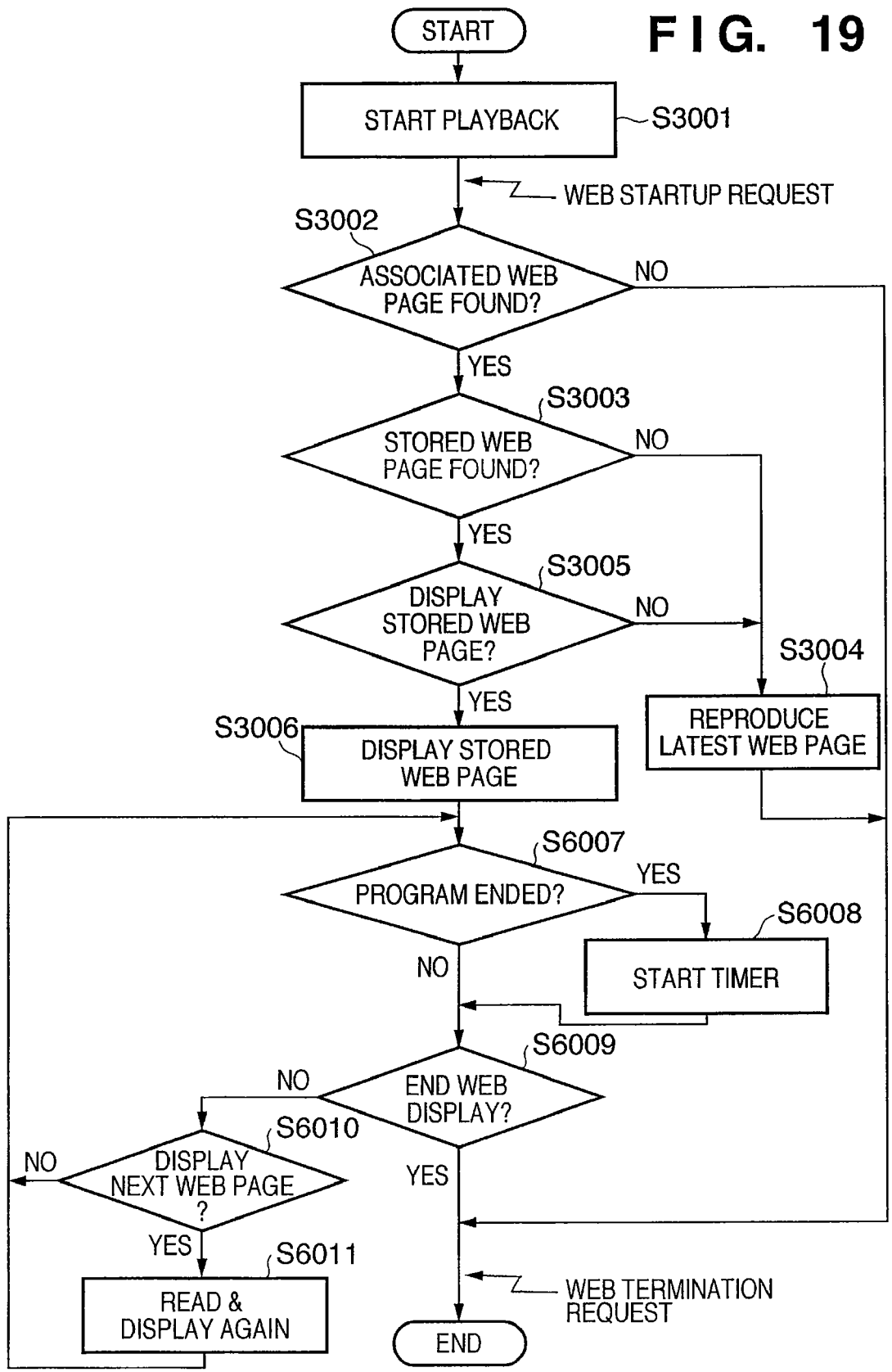

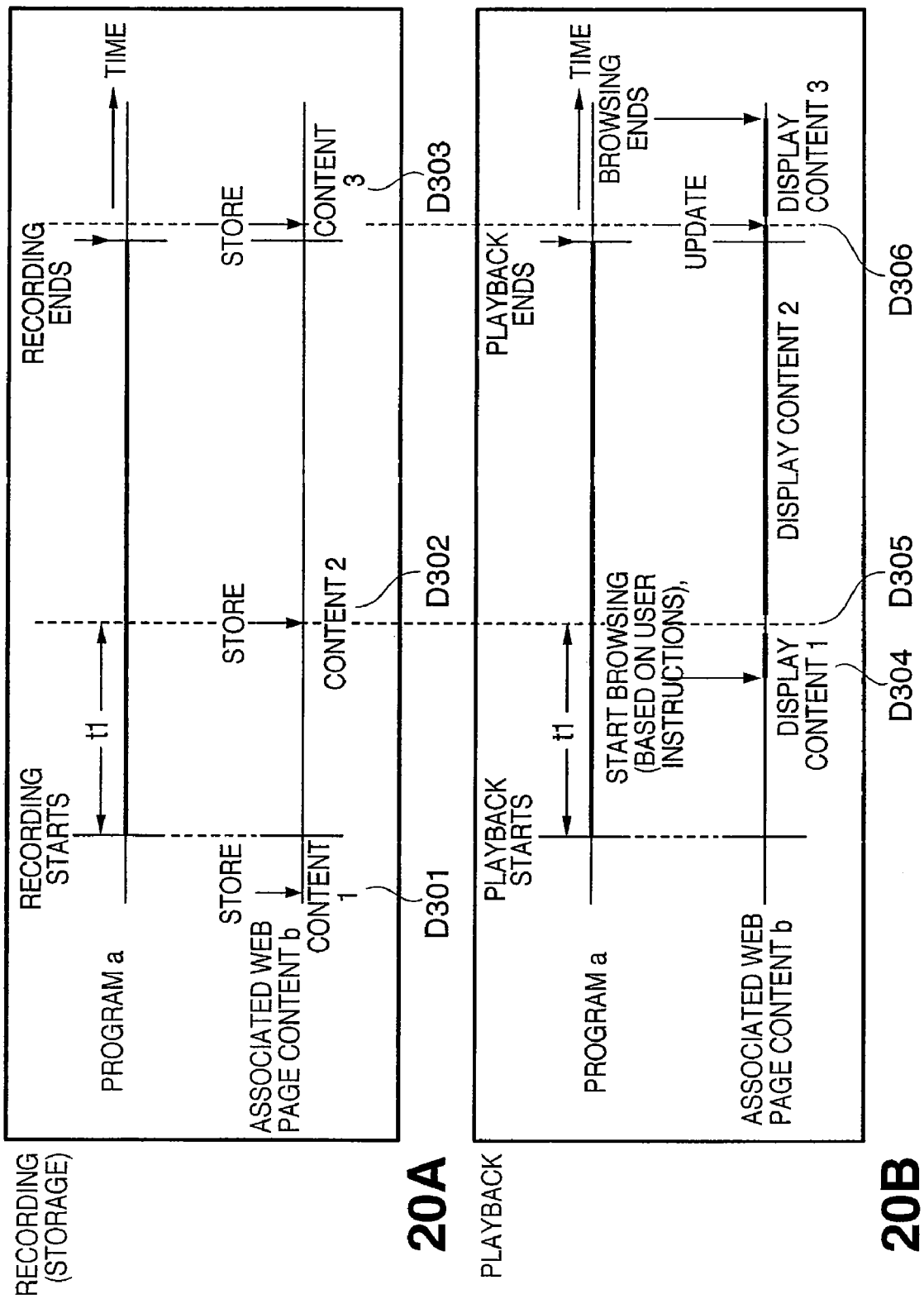
F I G. 20A
F I G. 20B

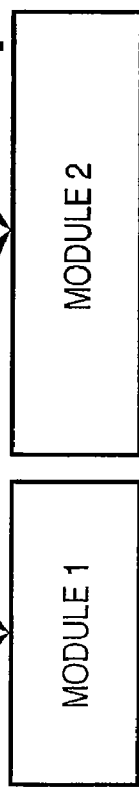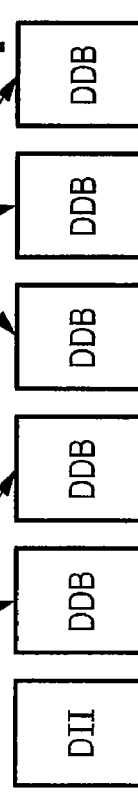

CONTENT STORAGE CONTROL APPARATUS AND CONTROL METHOD THEREFOR

BACKGROUND OF THE INVENTION

1. Field of the Invention

The present invention relates to a content storage control apparatus controlling the operations of recording and playback of broadcast programs (hereinafter referred to as "programs") and to a control method therefor.

2. Description of the Related Art

In recent years, broadcast receivers, PCs, and other equipment offering users the ability to connect to the Internet and browse Web pages etc. in addition to the features of broadcast wave reception and program viewing, has become increasingly common. Moreover, broadcasting companies and telecommunications carriers have discussed and proposed a variety of ideas related to merging broadcasting with telecommunications and it would not be hard to imagine that in the near future viewers will enjoy broadcasting services and telecommunication services seamlessly.

When a broadcast wave is viewed in real time in such a broadcast reception environment, for example, the use of URL information transmitted by broadcasting stations as additional information separately from video and audio allows users to enjoy services such as browsing Web pages associated with a program.

However, when a program was recorded in the past, such additional information was not recorded and, as a result, when the recorded program was viewed, it was impossible to use the URL information provided when the program was broadcast.

A technology permitting acquisition of URL information for Web pages (associated Web pages) associated with a program when a recorded program is played back has been disclosed in Japanese Patent Laid-Open No. 2002-215924, although in this case, the URL information is not provided by a broadcasting station when the program is broadcast. As described in Japanese Patent Laid-Open No. 2002-215924, when a program recorded by a user computer is played back, the computer accesses a program information-providing server, which stores URL information in association with program titles, and acquires the URL information corresponding to the program being played back. As a result, the user can check associated Web pages provided by the server during the playback of the recorded program.

However, the method described in Japanese Patent Laid-Open No. 2002-215924 requires the use of a separate server for providing program-related information. Furthermore, in addition to the fact that it is necessary to access the server during the playback of the program, no information is obtained regarding programs not registered on the server. Furthermore, information related to associated Web pages is still not included in the recorded data. For this reason, it is impossible, for instance, to obtain information on associated Web pages provided by a broadcasting station when the program is broadcast or Web pages that have been associated with the program by the user.

On the other hand, the use of URL addresses corresponding to programs scheduled for recording for the purpose of downloading reference data corresponding to the programs from the Web is disclosed in Japanese Patent Laid-Open No. 2002-94887. In addition, it is disclosed that the downloaded reference data and recorded programs are retained in association with one another and the reference data are also displayed when playing back the programs.

In Japanese Patent Laid-Open No. 2002-94887, the object is to download the reference data prior to the recording of the programs, that is, before the programs are broadcasted. In other words, the reference data is acquired once and stored. However, in actual practice, the content of the Web pages associated with a program is in many cases updated during the program is being broadcast. For instance, in some cases the content of the Web pages is updated as the program progresses. In such cases, there is a chance that the content of the stored associated Web pages displayed in parallel with playback when the recorded program is played back may not match the content of the program being played back if the reference data is acquired only once prior to the broadcast of the program, as described in Japanese Patent Laid-Open No. 2002-94887.

Furthermore, a method involving storing a TV program and web content corresponding to the TV program in a PVR and displaying the stored web content in sync with the playback of the stored TV program is disclosed in Japanese Patent Laid-Open (Tokuhyo) No. 2004-529588. In addition, as is disclosed in Japanese Patent Laid-Open (Tokuhyo) No. 2004-529588, a time stamp is appended to the stored TV programs and web content and, during program playback, the web content that has the same time stamps is read from the memory in accordance with the time stamps of the TV program. Also, as taught in Japanese Patent Laid-Open (Tokuhyo) No. 2004-529588, when a TV program is recorded, the web content is acquired more than once.

Japanese Patent Laid-Open (Tokuhyo) No. 2004-529588, however, makes no disclosure as to associating the acquisition of the web content with the updating of the web content itself. Namely, in accordance with the technique disclosed in Japanese Patent Laid-Open (Tokuhyo) No. 2004-529588, the content is downloaded and stored in the PVR on a constant basis even if there have been no updates to the web content itself. In other words, absolutely the same content may be stored multiple times, thereby lessening the storage capacity of the PVR.

SUMMARY OF THE INVENTION

The present invention was made with account taken of the above-described problems of the conventional technology. The present invention provides a content storage control apparatus which, in the process of recording, can record the content information of a Web page associated with a program in association with the program even if there have been updates to the Web page, as well as a control method therefor.

According to an aspect of the present invention, there is provided a content storage control apparatus comprising: a content acquiring unit configured to be capable of accessing a designated Web page and acquiring the content information of the Web page; a confirmation unit configured to check for the presence of an associated Web page associated with a broadcast program; an output unit configured to output the data of the broadcast program to a recording apparatus during the broadcast program is being broadcast; and a control unit configured to use, in case the associated Web page is present, the content acquiring unit to acquire the content information of the associated Web page and store the acquired content information in a storage unit in association with the broadcast program, wherein the control unit, during the output of the data of the broadcast program to the recording apparatus, determines whether the associated Web page has been updated and, upon determination that the Web page has been updated, stores the content information of the updated Web page in the storage unit in association with the broadcast program.

According to another aspect of the present invention, there is provided a method for controlling a content storage control apparatus comprising: a content acquisition step of accessing designated Web page to permit acquisition of the content information of the Web page; a confirmation step of checking for the presence of an associated Web page associated with a broadcast program; an output step of outputting the data of the broadcast program to a recording apparatus during the broadcast program is being broadcast; and a control step of acquiring, in case the associated Web page is present, the content information of the associated Web page in the content acquisition step and storing the acquired content information in a storage unit in association with the broadcast program, wherein in the control step, during the output of the data of the broadcast program to the recording apparatus, it is determined whether the associated Web page has been updated and, upon determination that the Web page has been updated, the content information of the updated Web page is stored in the storage unit in association with the broadcast program.

Further features of the present invention will become apparent from the following description of exemplary embodiments with reference to the attached drawings.

BRIEF DESCRIPTION OF THE DRAWINGS

FIG. 2A to FIG. 2E are diagrams schematically illustrating processing, whereby a decoding unit 1010 of FIG. 1 converts the TS data of a recorded program into partial TS data.

FIG. 3 is a diagram illustrating an exemplary correspondence information list stored in a correspondence information holding unit 1005 of FIG. 1.

FIG. 4 is a flow chart for illustrating the operation of program record scheduling in the TV receiver according to the first embodiment of the present invention.

FIG. 17 is a diagram illustrating an exemplary correspondence information list used in the second embodiment of the present invention.

FIG. 19 is a flow chart for illustrating the operation of playback in the TV receiver according to the second embodiment of the present invention.

FIG. 20A and FIG. 20B are diagrams explaining the relationship between the timing of storage of associated Web page content during recording and the associated Web pages displayed during the playback of the recorded program in the second embodiment of the present invention.

FIG. 23A to FIG. 23D are diagrams schematically illustrating a procedure whereby the decoding unit 1010 produces DSM-CC data from the received content information and stores it in the partial TS data in the third embodiment of the present invention.

DESCRIPTION OF THE EMBODIMENTS

Preferred embodiments of the present invention will now be described in detail in accordance with the accompanying drawings.

First Embodiment

Figure 1:
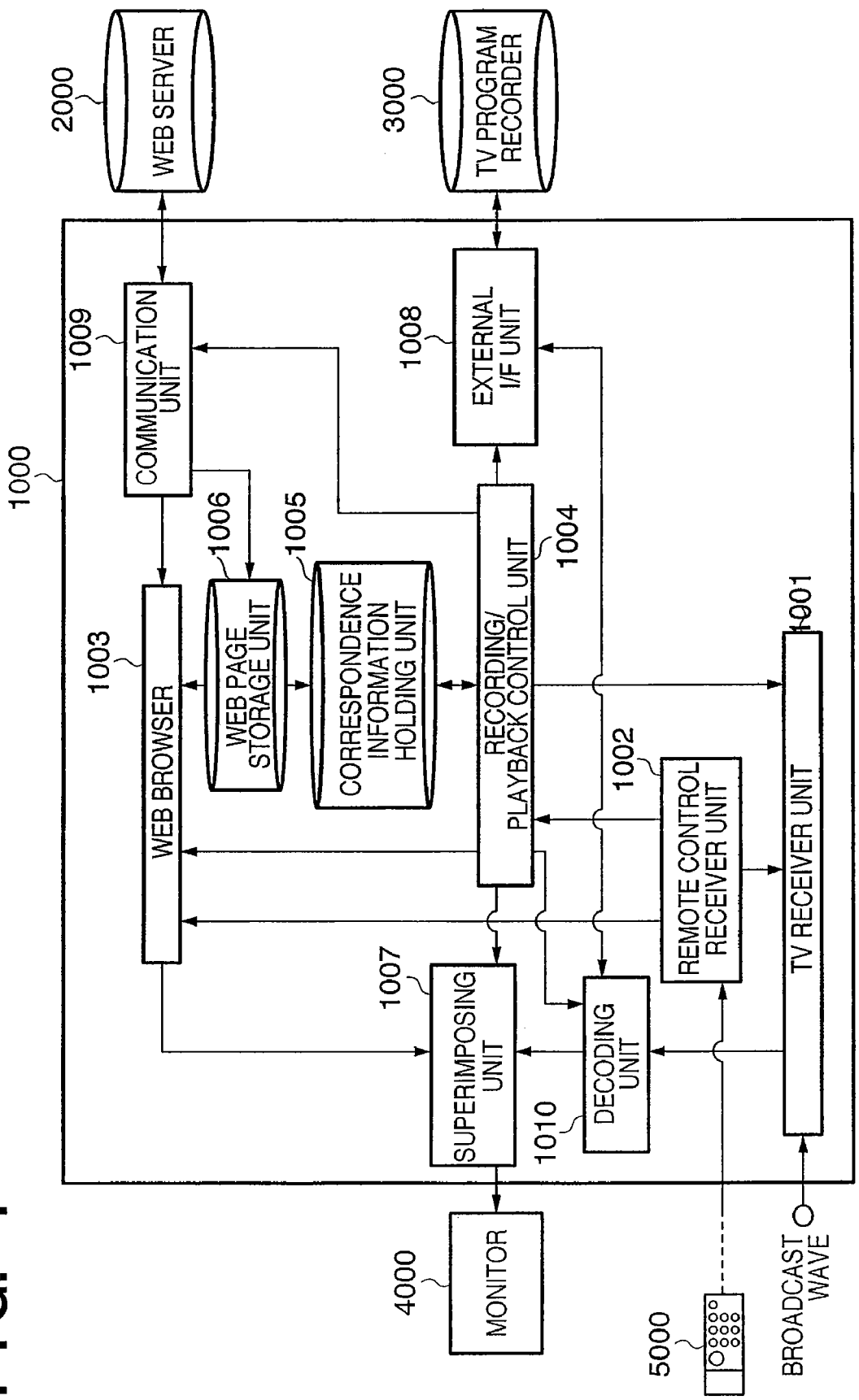
FIG. 1 is a diagram illustrating an exemplary configuration of a TV receiver 1000 representing an example of the content storage control apparatus used in a first embodiment of the present invention, as well as the associated external devices.

FIG. 1 is a diagram illustrating an exemplary configuration of a TV receiver 1000 representing an example of the content storage control apparatus used in a first embodiment of the present invention, as well as the associated external devices.

The TV receiver 1000 is provided with a TV receiver unit 1001, a remote control receiver unit 1002, a Web browser 1003, a recording/playback control unit 1004, a correspondence information holding unit 1005, and a Web page storage unit 1006. Furthermore, the TV receiver 1000 is provided with a superimposing unit 1007, an external I/F unit 1008, a communication unit 1009, and a decoding unit 1010.

Moreover, the TV receiver 1000 can be connected to the Internet through the communication unit 1009 and can communicate with any Web server 2000 located on the Internet. At the same time, the TV receiver 1000 is connected to a TV program recorder 3000 via the external I/F unit 1008, which is, for instance, an IEEE1394 interface or a LAN interface. The TV program recorder 3000, which is, for example, an HDD recorder or DVD recorder, records content such as programs etc. received from the TV receiver 1000 and can supply the recorded content to the TV receiver 1000.

The TV receiver unit 1001 receives broadcast waves of digital broadcasting, selects a carrier corresponding to a channel designated by the user, and performs the operation of demodulation. Furthermore, the TV receiver unit 1001 uses the demodulation results to generate data composed of multiplexed video, audio, and additional information (MPEG transport stream data, referred to as "TS data" below) and outputs it to the decoding unit 1010.

The decoding unit 1010 splits the TS data provided by the TV receiver unit 1001 into video data, audio data, and PSI/SI data (Program Specific Information/Service Information data) and performs the respective decoding. The decoding unit 1010 outputs the decoded video data to the superimposing unit 1007 and outputs audio data to an audio-synthesis unit (not shown). Moreover, the PSI/SI data is output to, and temporarily held in, a PSI/SI data storage unit (not shown), which may be nonvolatile or volatile.

Moreover, based on the control exercised by the hereinafter explained recording/playback control unit 1004, the decoding unit 1010 outputs the TS data of the recorded program received from the TV receiver unit 1001 to the TV program recorder 3000 through the external I/F unit 1008 when the program is being broadcast.

The recording of the present program is carried out by outputting the TS data of the currently broadcast program to the TV program recorder 3000 and recording the TS data using the TV program recorder. When the TS data is output to the TV program recorder 3000, the decoding unit 1010 converts the TS data into a partial transport stream (hereinafter referred to as "partial TS data").

FIG. 2A to FIG. 2E are diagrams schematically illustrating processing, whereby the decoding unit 1010 converts the TS data of the recorded program into partial TS data.

FIG. 2A to FIG. 2E illustrate mainly the operation of conversion to the PSI/SI data in the TS data. The TS data is a set of fixed-length TS packets (FIG. 2A), with each of the packets storing video data, audio data, or other data (FIG. 2B). It should be noted that the other data include data used for displaying data broadcast screens, PSI/SI data, etc.

The decoding unit 1010 extracts the PSI/SI data from the other data packets included in the TS data (FIG. 2C). FIG. 2C shows a PAT (Program Association Table), a PMT (Program Map Table), an EIT (Event Information Table), an SDT (Service Description Table), an NIT (Network Information Table), and a TOT (Time Offset Table) constituting part of the PSI/SI data.

Next, the decoding unit 1010 leaves the PAT and PMT within the acquired PSI/SI data and generates an SIT (Selection Information Table) using other PSI/SI data (in FIG. 2C, EIT, SDT, NIT, and TOT) (FIG. 2D). Information related to the recorded program, which is included in the EIT, SDT, NIT, and TOT, is used for the generation of the SIT. Specifically, such information includes, for instance, the title of the recorded program, its outline, genre/sub-genre, audio-visual format information, service information, network information, and the like. Moreover, the decoding unit 1010 also adds new information used for the partial TS data to the SIT. The "new information" is, for instance, the maximum packet rate of the partial TS data, the time required to output the partial TS data, etc. After that, the decoding unit 1010 converts the PAT, PMT, and SIT into TS packets and moves them back into the original TS data (FIG. 2E).

The superimposing unit 1007 synthesizes video data decoded by the decoding unit 1010 and picture data for the GUI etc. produced by the Web browser 1003 and recording/playback control unit 1004 and outputs a composite image to the monitor 4000. It should be noted that the monitor 4000 may constitute a component of the TV receiver 1000.

The remote control receiver unit 1002 receives remote control information output from a remote control 5000. Generally speaking, the remote control receiver unit 1002 receives remote control information through an infrared input port (not shown) and, using the remote control information, figures out remote control codes corresponding to remote control keys and identifies the status of the remote control (long pressing of a button, etc.). Here, the term "remote control information" refers to information that links remote control codes to the status of the remote control. Depending on the status of the TV receiver 1000 or remote control information, the received remote control information is forwarded to the TV receiver unit 1001, recording/playback control unit 1004, or Web browser 1003. For instance, in a state, wherein a remote control code included in the remote control information corresponds to a tuning-related remote control key and the TV receiver unit 1001 is receiving a digital broadcast wave, the remote control receiver unit 1002 forwards the remote control information to the TV receiver unit 1001. The TV receiver unit 1001 then carries out reception and tuning operations corresponding to the forwarded remote control information. In addition, in a state, wherein a remote control code corresponds to a recording-related remote control key and the TV receiver unit 1001 is receiving a digital broadcast wave, the remote control receiver unit 1002 forwards the remote control information to the recording/playback control unit 1004.

The external I/F unit 1008 sends and receives data to/from external devices such as the TV program recorder 3000, etc. In this embodiment, the external I/F unit 1008 outputs data output from the decoding unit 1010 to the TV program recorder 3000 and forwards data supplied from the TV program recorder 3000 to the decoding unit 1010.

The communication unit 1009 connects to the Internet and carries out communication with various servers located on the Internet. In this embodiment, the communication unit 1009 acquires Web page content information managed and maintained by a Web server 2000 on the Internet and forwards it to the Web browser 1003 or Web page storage unit 1006. Here, the term "Web page content information" refers to information necessary for browsing Web pages offline and corresponds to HTML (Hyper Text Markup Language) documents describing Web pages and various types of mono-media data (such as JPEG data and GIF data) referenced in the HTML documents. It should be noted that, depending on the type and location of the mono-media data, its acquisition may not necessarily be possible, but because addressing such cases is not directly related to the present invention, the corresponding explanations are omitted.

The Web browser 1003 performs the operations of parsing and layout of HTML documents acquired via the communication unit 1009 and generates GUI data for the Web pages (display bitmap data). At such time, the decoding of the mono-media data referenced in the HTML documents is carried out simultaneously. The generated display bitmap data is displayed on the monitor 4000 via the superimposing unit 1007.

The Web page storage unit 1006 stores the Web page content information acquired from the Web server 2000 via the communication unit 1009. At the same time, information on the storage locations used to read the stored Web page content information from the Web page storage unit 1006 is communicated to the correspondence information holding unit 1005. The information on the storage locations may include, for instance, information on the directory paths of folders or files in which the Web page content information is stored.

The correspondence information holding unit 1005 maintains a list (hereinafter referred to as the "correspondence information list") showing the correspondence (hereinafter referred to as the "correspondence information") between the programs recorded by the TV program recorder 3000 and Web page content information stored in the Web page storage unit 1006.

FIG. 3 is a diagram illustrating an exemplary correspondence information list stored in the correspondence information holding unit 1005. The correspondence information is composed of information that permits identification of the programs recorded by the TV program recorder 3000 (recorded-program information) and information that permits identification of the Web page content information stored in the Web page storage unit 1006 (stored Web page information). In the present embodiment, the recorded-program information includes, for instance, service names, program start times, and program titles. In addition, the stored Web page information includes, for instance, Internet addresses (the URLs of the source Web servers), storage times, and storage location information.

Moreover, the recorded-program information and stored Web page information include information showing whether the corresponding programs and Web page content information have been recorded/stored. The recording status and storage status in FIG. 3 correspond to such information. In the present embodiment, the recording status and storage status assume values such as "scheduled" or "completed". It should be noted that the correspondence information holding unit 1005 and Web page storage unit 1006 can be implemented, for instance, as different areas of the same storage device.

It should be noted that while the example of FIG. 3 illustrates a case, in which a single stored Web page information corresponds to a single recorded-program information, more than one stored Web page information may be associated with a single recorded program information.

The recording/playback control unit 1004 performs the following operations:
  generation of recording schedule screen data;
  management of recording schedule configuration information;
  control over the operation of scheduled recording, and,
  control over the storage of Web pages.

When the recording/playback control unit 1004 receives remote control information used for scheduling recording via the remote control receiver unit 1002, it uses the PSI/SI information etc. to generate recording schedule screen data and outputs it to the superimposing unit 1007. As a result, a recording schedule screen is displayed on the monitor 4000. Remote control information concerning the operation of the recording schedule screen is supplied to the recording/playback control unit 1004 and the recording/playback control unit 1004 modifies the recording schedule screen data in accordance with the remote control information. Moreover, when the recording schedule is decided, the recording schedule configuration information (title of program to be recorded, recording start time, duration, etc.) configured using the recording schedule screen is saved in an internal memory, not shown. The recording/playback control unit 1004 then periodically checks a calendar clock etc., not shown, and when the recording start time arrives, or shortly prior thereto, transmits control information instructing the TV receiver unit 1001, decoding unit 1010, and external I/F unit 1008 to execute the scheduled recording operation.

In addition, the recording/playback control unit 1004 saves Web page storage configuration information (URLs of the Web pages to be stored, storage start time) necessary for carrying out storage if, during record scheduling, it is specified that associated Web pages are to be stored in the internal memory. When the corresponding storage start time arrives, the control information used for carrying out the Web page storage operation is transmitted to the communication unit 1009 and Web page storage unit 1006.

FIG. 4 is a flow chart for illustrating the program record scheduling operation in the TV receiver 1000 according to the first embodiment of the present invention. Upon receipt of record scheduling-related remote control information from the remote control 5000, the remote control receiver unit 1002 forwards it to the recording/playback control unit 1004. Upon receipt of the remote control information, the recording/playback control unit 1004 generates and displays an electronic program guide screen used as a recording schedule screen (S1001). Accordingly, remote control information with instructions to display the electronic program guide is also included in the remote control information used for record scheduling. The electronic program guide displayed herein is similar to electronic program guides commonly used nowadays, whose configuration typically includes a time axis and a service name (channel number) axis, as is often done in the TV program sections of newspapers.

Users operate the displayed electronic program guide with the help of the remote control 5000 to select a program they wish to record and configure the recording time, image quality, and other recording schedule settings (S1002).

Here, information related to recording schedule configuration (hereinafter referred to as "recording schedule configuration information") includes:
  program-identifying information (for instance, a broadcast network ID (original_network_id), TS data identification information (transport_stream_id), service identification information (service_id), a service name, program identification information (event_id), a program title, and other program-identifying information included in the EIT),
  recording start time,
  duration,
  image quality mode,
  information on the equipment to be used for recording, etc.

Subsequently, when the user issues a request to execute the recording schedule, the recording/playback control unit 1004 checks for the presence of Web pages associated with the program scheduled for recording (S1003).

Such confirmation can be carried out, for instance, by checking whether the addresses of associated Web pages are included in the information provided by the broadcasting station as additional information regarding the program to be recorded, such as the programming information contained in the EIT, etc.

Moreover, the user can employ any other methods to check whether any associated Web pages are associated with the program.

The methods, whereby the user registers programs in association with Web pages, are not limited in any particular method, and any methods can be used. For instance, let us assume that a certain Web page on the Internet has been accessed via the communication unit 1009 using the Web browser 1003 incorporated into the TV receiver 1000. If the Web page registration button is depressed by the user on the remote control 5000 in this state, the remote control information is fed to the recording/playback control unit 1004 via the remote control receiver unit 1002.

The recording/playback control unit 1004 generates GUI data for inquiring whether to register the currently displayed Web page in association with the program and displays it on the monitor 4000 via the superimposing unit 1007. When a response to the effect that the page is to be registered is returned by the user through the remote control 5000, the recording/playback control unit 1004 displays the electronic program guide and allows the user to select a program associated with the Web page.

When a program is specified using the electronic program guide, along with acquiring identification information concerning the specified program from the EIT, the recording/playback control unit 1004 acquires the address information (URL) of the currently displayed Web page from the Web browser 1003 and stores both of them in the internal memory etc. in association with each other.

Using such a procedure, the user can register the Web page being currently displayed by the Web browser 1003 in association with the desired program.

In addition, when the recording schedule is executed, the recording/playback control unit 1004 can confirm the presence of Web pages associated with the scheduled program by checking whether the recorded program is included in the registration information saved in the internal memory.

If it is found in S1003 that there are no Web pages (associated Web pages) associated with the scheduled program, the recording/playback control unit 1004 saves the recording schedule configuration information and terminates the scheduling operation.

Figure 5:
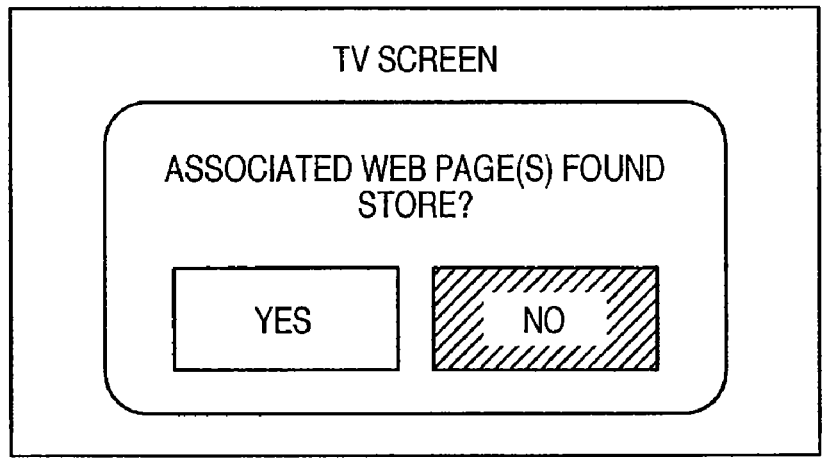
FIG. 5 is a diagram illustrating an exemplary confirmation screen displayed by a recording/playback control unit 1004 in S1004 of FIG. 4.

On the other hand, if it is found in S1003 that there are Web pages associated with the program scheduled for recording, the recording/playback control unit 1004, along with issuing a notification of the presence of the associated Web pages, generates confirmation screen data used to perform a query as to whether the content information of the associated Web pages should be stored. The recording/playback control unit 1004 then displays a confirmation screen on the monitor 4000 via the superimposing unit 1007 (S1004). FIG. 5 shows an exemplary confirmation screen displayed by the recording/playback control unit 1004.

If the user selects "No" on the confirmation screen via the remote control 5000, the recording/playback control unit 1004 saves the recording configuration information and terminates the scheduling operation. On the other hand, if "Yes" is selected on the confirmation screen, the recording/playback control unit 1004 acquires the address information (Web page URLs) of the associated Web pages. The recording/playback control unit 1004 then uses the address information to access the Web server 2000 providing the associated Web pages via the communication unit 1009 (S1005).

If it is found in S1005 that there is a so-called broken link that cannot be accessed by the Web server 2000, or can be accessed but does not have the desired Web page, the recording/playback control unit 1004 notifies the user of the absence of associated Web pages (S1006).

Figure 6:
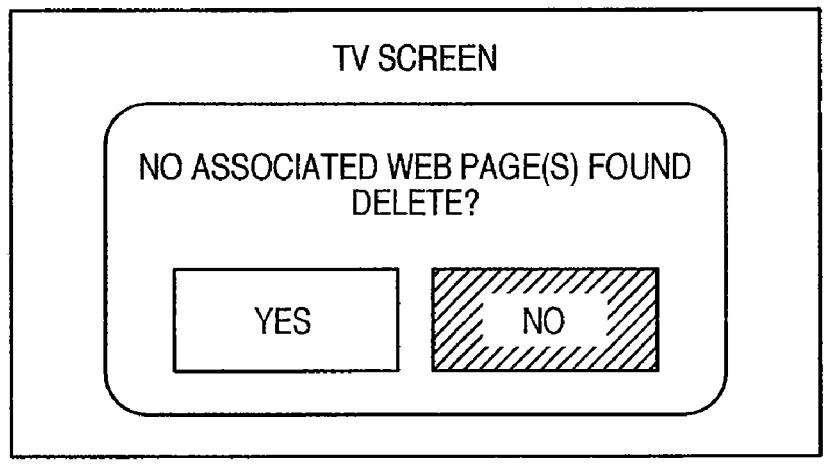
FIG. 6 is a diagram illustrating an exemplary query screen displayed by the recording/playback control unit 1004 in S1006 of FIG. 4.

Moreover, the recording/playback control unit 1004 simultaneously inquires whether to cancel the association between the associated Web pages and the scheduled program. FIG. 6 illustrates an exemplary query screen displayed by the recording/playback control unit 1004 in S1006.

If the user selects "No" on the query screen via the remote control 5000 (S1007, "NO"), the recording/playback control unit 1004 saves the recording schedule configuration information and terminates the scheduling operation. On the other hand, if "Yes" is selected (S1007, "YES") and the associated Web page is user-configured, the recording/playback control unit 1004 deletes the registration information (associated Web information) stored in the internal memory (S1008), saves the recording schedule configuration information, and terminates the scheduling operation.

Figure 7:
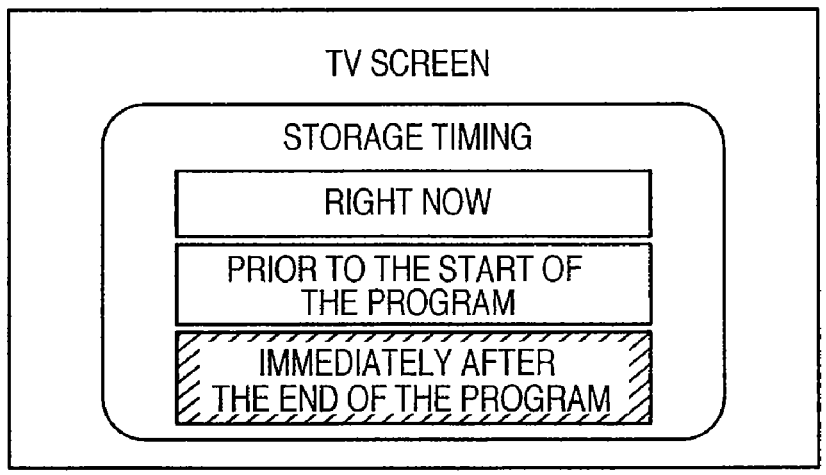
FIG. 7 is a diagram illustrating an exemplary timing configuration screen displayed by the recording/playback control unit 1004 in S1009 of FIG. 4.

If it is found in S1005 that associated Web pages are accessible, the recording/playback control unit 1004 presents the user with a storage timing configuration screen for Web page content information (S1009). FIG. 7 shows an exemplary timing confirmation screen displayed by the recording/playback control unit 1004.

In the example of FIG. 7, the user can choose among storage timing options such as "right now", "immediately prior to the start of the program", and "immediately after the end of the program".

When the user selects the option "right now" on the timing configuration screen, the recording/playback control unit 1004, after saving the recording schedule information and terminating the scheduling operation, immediately performs the operation of acquisition/storage of Web page content information. In addition, when the option "immediately prior to the start of the program" is selected, the recording/playback control unit 1004 performs the operation of acquisition/storage of Web page content information a predetermined period of time prior to the start time of the program. When the option "immediately after the end of the program" is selected, the recording/playback control unit 1004 performs the operation of acquisition/storage of Web page content information when the operation of scheduled program recording ends and a predetermined time passes thereafter.

It should be noted that while in the example of FIG. 7 there are three alternatives including "right now", "immediately prior to the start of the program", and "immediately after the end of the program", the user may also specify an exact time and date. Here, the corresponding explanations are omitted because the GUI used for time-and-date settings, as well as the methods used to acquire preset timing, are well known.

Based on the user instructions provided via the timing configuration screen, the recording/playback control unit 1004 determines the storage timing of the Web page content information, saves the recording schedule configuration information and information on the schedule of storage of Web page content information, and terminates processing. Here, the storage schedule information comprises storage times and address information (e.g. URLs) used for the associated Web pages to be stored. Moreover, at such time, new correspondence information is added to the correspondence information list. If neither program recording nor Web page content information storage have been carried out, the recording status/storage status indicated in the correspondence information will be set, respectively, to "scheduled". Moreover, the storage location will not be noted.

(Recording Operation and Web Page Content Information Collection Operation)

Figure 8:
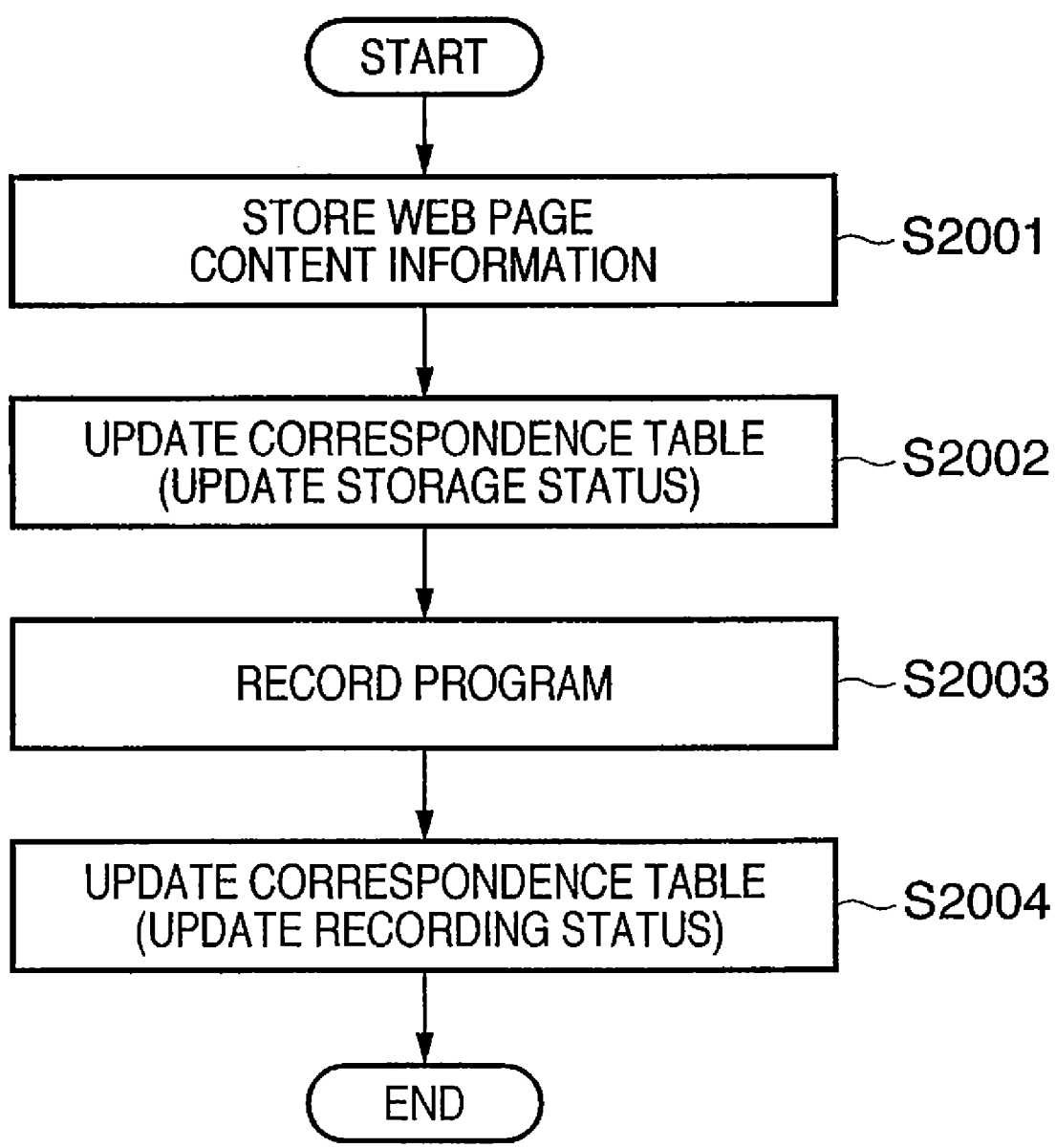
FIG. 8 is a flow chart for illustrating the operations of Web page storage and execution of scheduled program recording in the TV receiver according to the first embodiment of the present invention.

FIG. 8 is a flow chart for illustrating the operations of Web page storage and execution of scheduled program recording in the TV receiver according to the first embodiment of the present invention.

It should be noted that FIG. 8 illustrates a processing procedure used when the associated Web page storage timing during the record scheduling operation shown in FIG. 4 is set to "immediately prior to the start of the program". Based on the storage time indicated in the storage schedule information, the recording/playback control unit 1004 detects the arrival of the storage time (a predetermined period of time prior to the start time of the program scheduled for recording). The recording/playback control unit 1004 then issues a request to the communication unit 1009 for acquisition of the content information of Web pages corresponding to the address information contained in the storage schedule information. In response to this request, the communication unit 1009 accesses the Web server 2000, which holds the content information of the associated Web pages, and performs the acquisition of the content information of the associated Web pages (S2001).

Specifically, along with acquiring the HTML documents of the Web pages defined by the address information, the communication unit 1009 acquires mono-media files (image files, etc.) referenced in the HTML documents. Furthermore, it may also acquire the content of other Web pages linked to the HTML documents. The communication unit 1009 stores the acquired Web page content information in the Web page storage unit 1006. It should be noted that the collection of Web page content information can also be implemented with the help of the page-saving feature that the Web browser 1003 has.

After storing the Web page content information, the Web page storage unit 1006 accesses the correspondence information list held in the correspondence information holding unit 1005 and updates the data of the correspondence information corresponding to the stored Web page content information. In other words, it adds information concerning storage locations along with changing the value of the storage status in the correspondence information from "scheduled" to "completed" (S2002).

Subsequently, upon the arrival of the recording start time indicated in the recording schedule configuration information, the recording/playback control unit 1004 requests that the TV receiver unit 1001, decoding unit 1010, and external I/F unit 1008, respectively, record the program described in the recording schedule configuration information (S2003). Upon receipt of the program, the TV receiver unit 1001 converts it to TS data and forwards it to the decoding unit 1010. The decoding unit 1010 uses the TS data received from the TV receiver unit 1001 to generate partial TS data in the above-described manner. The external I/F unit 1008 outputs the partial TS data to the corresponding equipment intended for recording (TV program recorder 3000), as described in the recording schedule configuration information. The TV program recorder 3000 records the partial TS data on a DVD, HDD, or another storage medium in a predetermined format.

Figure 9:
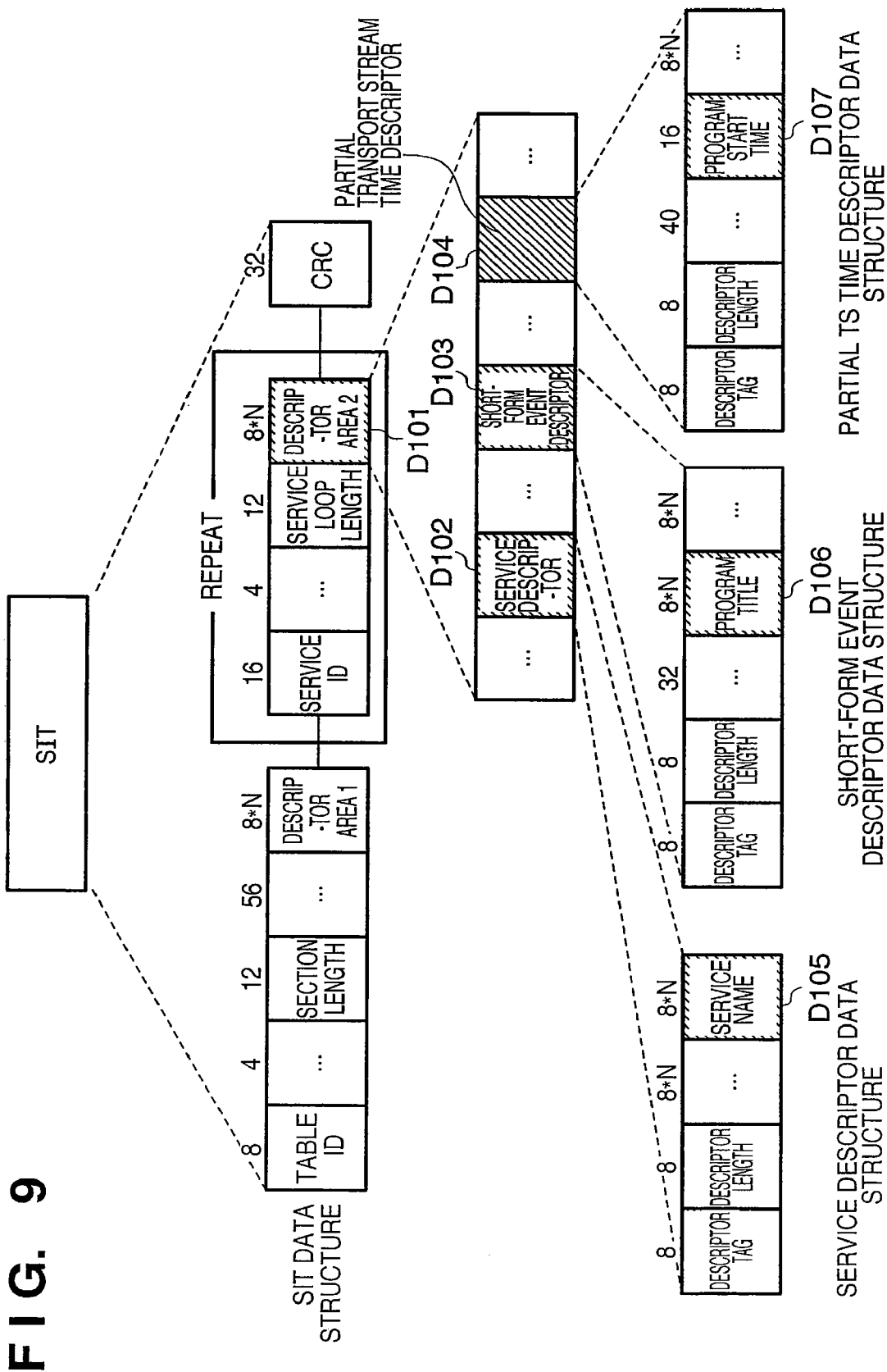
FIG. 9 is a diagram illustrating the data structure of an SIT contained in the partial TS data.

The partial TS data output via the external I/F unit 1008 must contain the recorded-program information (service names, program start times, and program titles) as the correspondence information. FIG. 9 is a diagram illustrating the data structure of an SIT included in the partial TS data. As shown in FIG. 9, the service name D105 is described in a service descriptor D102 located in the descriptor area 2D101 of the SIT. The program title D106 is described in a short-form event descriptor D103 located in the descriptor area 2D101 of the SIT. The program start time D107 is described in a partial transport stream time descriptor D104 located in the descriptor area 2D101 of the SIT.

When the recording of the program is over, the recording/playback control unit 1004 updates the data of the correspondence information corresponding to the recorded program. In other words, it changes the value of the recording status contained in the correspondence information from "scheduled" to "completed" (S2004). After that, it terminates the recording operation.

(Playback Operation)

Figure 10:
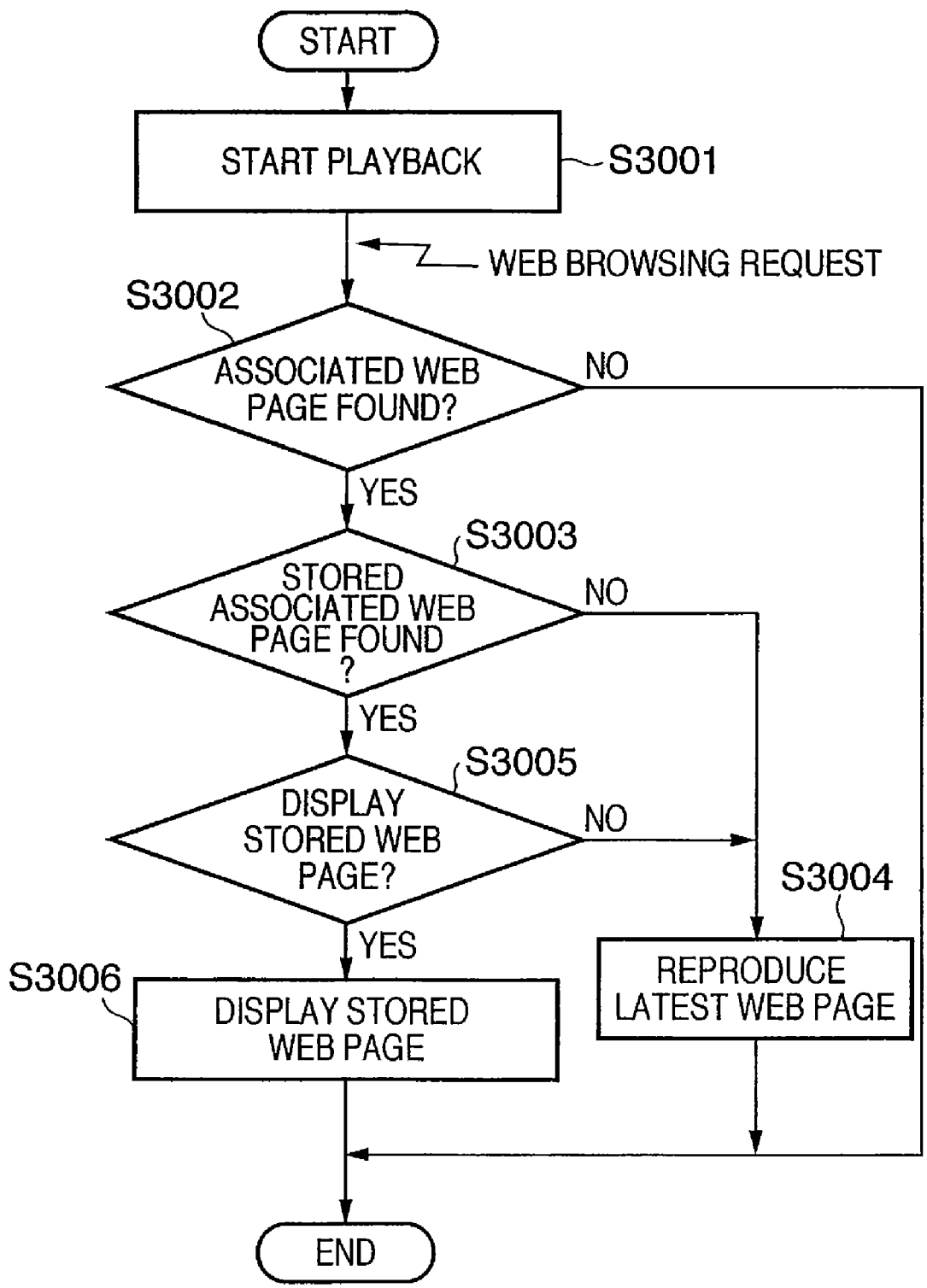
FIG. 10 is a flow chart for illustrating the operation of playback in the TV receiver according to the first embodiment of the present invention.

FIG. 10 is a flow chart for illustrating the operation of playback in the TV receiver according to the first embodiment of the present invention.

Upon receipt of a playback instruction for a certain recorded program through the remote control receiver unit 1002, the recording/playback control unit 1004 starts playback (S3001). Specifically, the recording/playback control unit 1004 requests that the TV program recorder 3000 output the indicated recorded program to the TV receiver 1000. In response to this request, the TV program recorder 3000 reads the partial TS data of the recorded program from a storage medium, such as a DVD or HDD, and outputs it to the TV receiver 1000. The output partial TS data is forwarded to the decoding unit 1010 via the external I/F unit 1008 and decoded. Subsequently, after going through the superimposing unit 1007, the data is displayed on the monitor 4000 as a reproduced image.

Moreover, the decoding unit 1010 acquires the service name, program title, and program start time (corresponding, respectively, to D105, D106, and D107 of FIG. 9) of the recorded program being played back from the SIT contained in the partial TS data and communicates them to the recording/playback control unit 1004.

If the recording/playback control unit 1004 receives remote control information with a request to browse associated Web pages during the playback of the recorded program, it checks for the presence or absence of Web pages associated with the recorded program being played back (S3002). Specifically, the recording/playback control unit 1004 uses the recorded program-related information communicated by the decoding unit 1010 to check for the presence or absence of associated Web pages by searching the correspondence information list stored in the correspondence information holding unit 1005 and the information stored in the internal memory.

Then, if there are no Web pages associated with the recorded program being played back, the recording/playback control unit 1004 continues the playback operation without change and does not perform the operation of displaying Web pages. It should be noted that a message notifying the user of the absence of registered associated Web pages may be displayed in such a case.

On the other hand, if there are associated Web pages, the recording/playback control unit 1004 accesses the correspondence information list held in the correspondence information holding unit 1005 and checks whether it stores the content information of the associated Web pages of the recorded program being played back (S3003).

If the response of the user to the query performed when recording is scheduled (FIG. 4, S1004) is to the effect that associated Web pages are not to be stored, no correspondence information is recorded in the correspondence information holding unit 1005 even if there are associated Web pages stored in the internal memory.

If no recorded-program information corresponding to the service name, program title, and program start time communicated by the decoding unit 1010 is found in the correspondence information list, the recording/playback control unit 1004 determines that no stored Web page information has been stored.

The recording/playback control unit 1004 then uses the address information stored in the internal memory to acquire associated Web pages from the Web server 2000 and displays the associated Web pages (S3004). Specifically, the recording/playback control unit 1004 requests that the Web browser 1003 display the associated Web pages along with their address information. The Web browser 1003 accesses the Web server 2000 holding the content information of the associated Web pages via the communication unit 1009 and acquires the content information of the associated Web page. Using the acquired Web page content information, the Web browser generates browsing GUI data and displays it on the monitor 4000 via the superimposing unit 1007.

Figure 11:
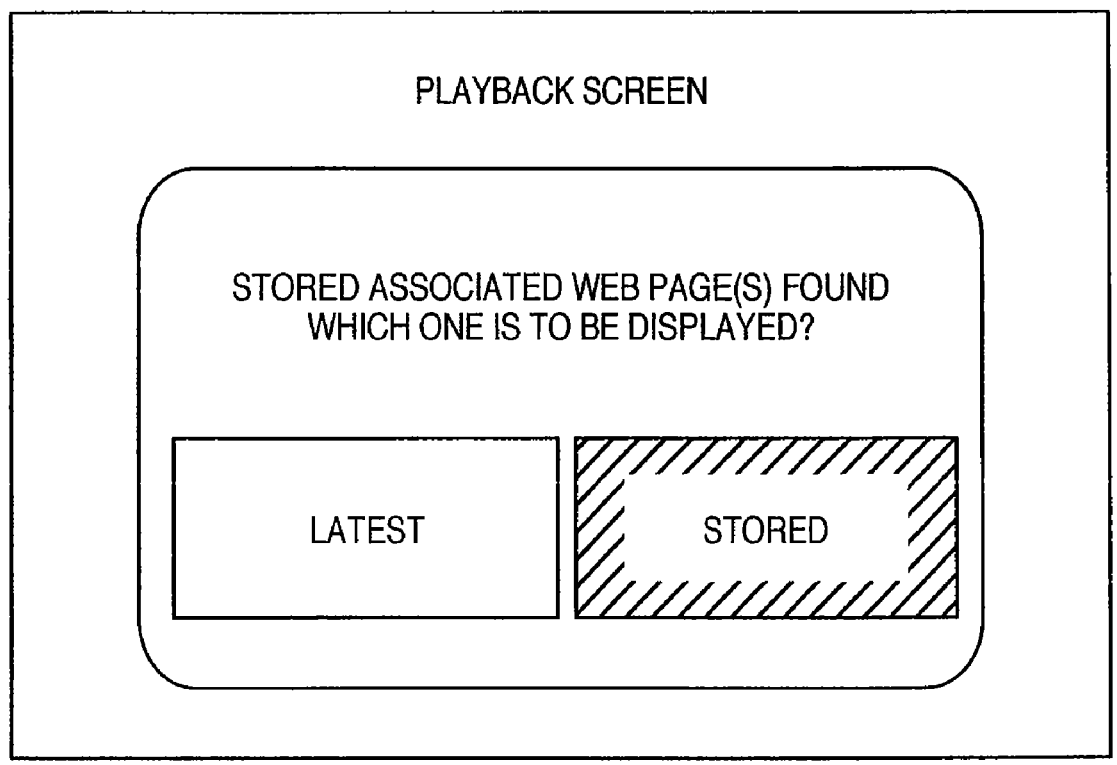
FIG. 11 is a diagram illustrating an exemplary timing configuration screen displayed by the recording/playback control unit 1004 in S3005 of FIG. 10.

In S3003, it is assumed that recorded-program information matching the service name, program title, and program start time of the recorded program being played back is contained in the correspondence information list and the storage status of the stored Web page information is set to "completed". In such a case, the recording/playback control unit 1004 determines that Web page content information related to the recorded program being played back has been stored. The recording/playback control unit 1004 then displays the GUI illustrated in FIG. 11 on the monitor 4000 and lets the user choose whether to display the stored Web pages or the latest Web page (S3005). Thus, in the present embodiment, after learning of the presence of stored associated Web pages, the user can choose to display Web pages from a particular point in time.

If the user wishes to display the latest associated Web page, the recording/playback control unit 1004 performs the processing described above in S3004. If the user wishes to display a stored Web page, the recording/playback control unit 1004 provides the Web browser 1003 with the storage location of the stored Web page information and requests that the stored Web page be displayed (S3006). The Web browser 1003, which receives the request, acquires the Web page content information stored in the Web page storage unit 1006. Subsequently, using the acquired Web page content information, it generates browsing GUI data and displays it on the monitor 4000 via the superimposing unit 1007. It should be noted that Web pages may be displayed in any format, such as, for instance, a double-window format produced by splitting the screen into a recorded program display screen and an associated Web page browsing screen. Alternatively, the associated Web page browsing screen may be displayed alone in full screen mode.

As explained above, in the present embodiment, if there are associated Web pages of a program scheduled for recording, the content information of the associated Web pages can be stored. In addition, the associated Web pages can be displayed when playing back the recorded program.

For instance, when the associated Web pages are stored during the program broadcast period or shortly prior or subsequent thereto, the user can view the associated Web pages in substantially unchanged form in comparison with the broadcast period even during playback of a recorded program. Considering that access to the associated Web pages may become impossible and their contents may be changed if, for instance, the program is played back upon lapse of a considerable period of time from the time of the broadcast, storing the content information of the associated Web pages makes it possible to check the associated Web pages in a reliable manner and in accordance with the content they had at the time of the broadcast.

Furthermore, because it is possible to access the associated Web pages at the time of playback if the presence of Web pages associated with the recorded program is confirmed, the user also can check the latest state of the associated Web pages.

Alternate Embodiments

It should be noted that the associated Web pages are sometimes supplied by the broadcasting station while the program is broadcast. For this reason, if an address of an associated Web page is supplied as PSI/SI information during the operation of scheduled recording, the apparatus may be adapted to access the address and store the content information of the associated Web page.

Specifically, when a program having registered correspondence information is recorded, the recording/playback control unit 1004 periodically checks whether any associated Web page-related information has been supplied by the broadcasting station. Then, if information concerning an associated Web page is supplied, the content information of the associated Web page is automatically stored in the Web page storage unit 1006. Furthermore, the recording/playback control unit 1004 adds the stored Web page information to the correspondence information.

It should be noted that if, during playback, there is more than one associated Web pages, the user may be allowed to decide which page to display.

Second Embodiment

Explanations regarding a TV receiver used in a second embodiment of the present invention are provided next. Since its functional configuration may be identical to that of the TV receiver 1000 illustrated in FIG. 1, the corresponding explanations are omitted, and only operations specific to the present embodiment are explained.

The first embodiment permitted recording of associated Web pages of a recorded program and made it possible to present the associated Web pages to the user during playback. However, in the first embodiment, the content information of a given associated Web page was acquired once and then stored. Therefore, in case of content updates, such as when an associated Web page is updated during a program is being broadcast, the content of the stored associated Web pages displayed during the playback of the recorded program may not match the content of the program that is played back.

Specifically, let us assume that we have an associated Web page showing the progress of a game and competition while successively updating its content, such as a Web page associated with a program providing live broadcasts of sport events, etc. In such a case, in the first embodiment, the progress and results of the game or competition that is about to start will end up being displayed if the associated Web pages stored immediately upon termination of the program are displayed at the start of the playback of the recorded program. Moreover, the same problem would affect associated Web pages as well, whose content is supplemented as the program progresses. In the present embodiment, such mismatch between the reproduced content and the content of the stored associated Web pages has to be minimized.

Figure 12:
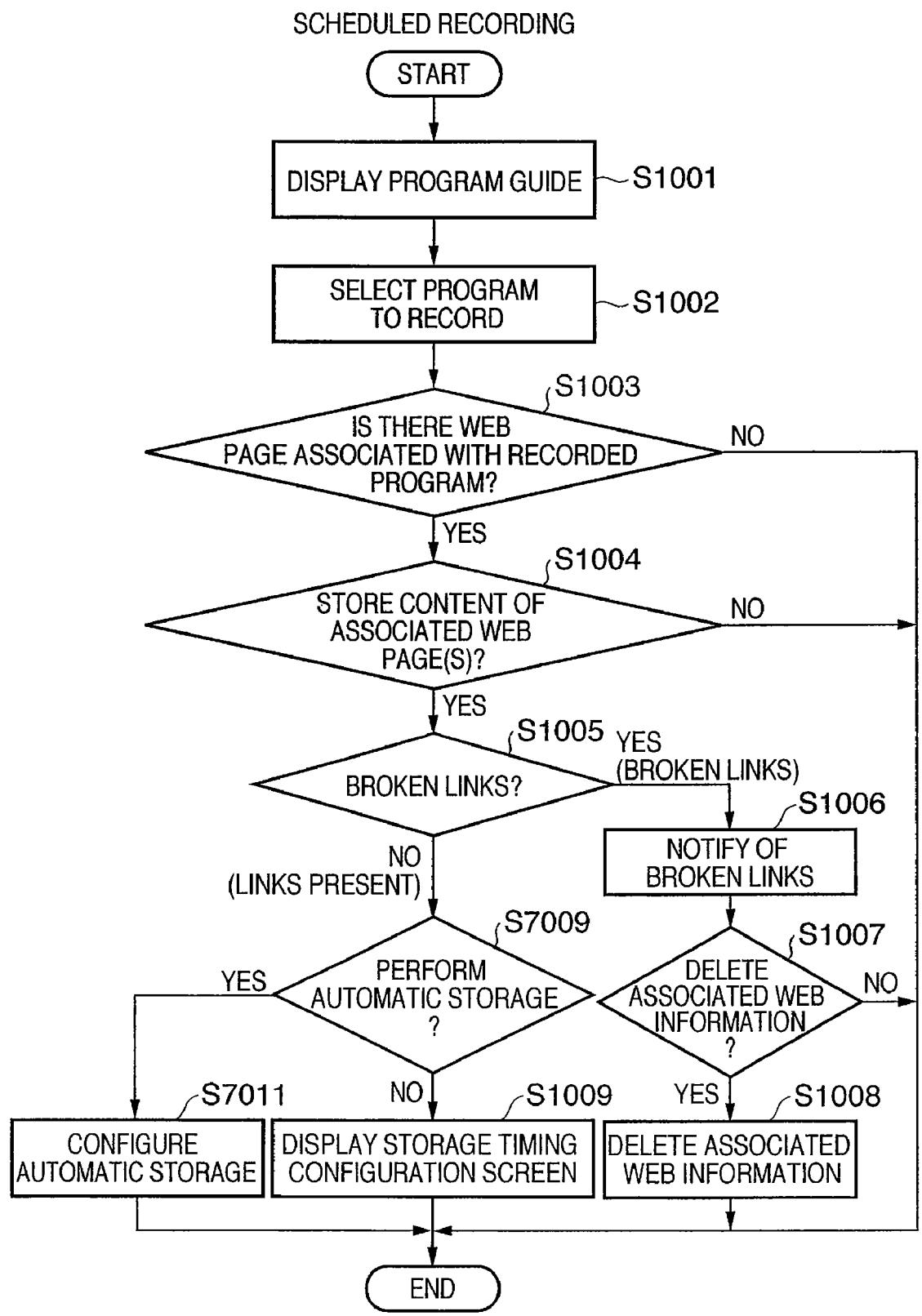
FIG. 12 is a flow chart for illustrating the operation of program record scheduling in the TV receiver 1000 according to a second embodiment of the present invention.

FIG. 12 is a flow chart for illustrating the operation of program record scheduling in the TV receiver 1000 according to the second embodiment of the present invention. Steps involving the same operations as in FIG. 4 are assigned the same reference numerals, with the corresponding explanations omitted. The difference from the first embodiment consists in the addition of S7009 and S7011. These two steps are explained below.

If it is found in S1005 that the content information of the associated Web pages can be acquired, the recording/playback control unit 1004 confirms with the user whether the operation of automatic storage of Web page content information is to be performed (S7009).

Figure 13:
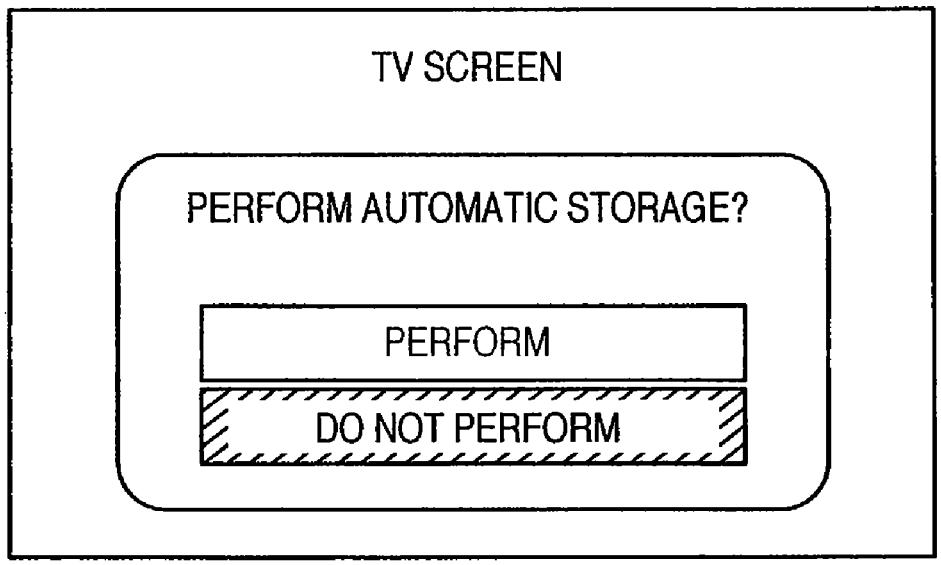
FIG. 13 is a diagram illustrating an exemplary GUI screen presented to the user by the recording/playback control unit 1004 in S7009 of FIG. 12.

FIG. 13 is a diagram illustrating an exemplary GUI screen presented to the user by the recording/playback control unit 1004 in S7009.

In the example of FIG. 13, the user can choose between options including "perform" or "do not perform". If the user selects the option "do not perform", the program proceeds to S1009, in which the recording/playback control unit 1004 displays a Web page content information storage time configuration screen to the user.

On the other hand, if in S7009 the user selects the option "perform", the recording/playback control unit 1004 presents the user with an automatic storage configuration screen (S7011).

Figure 14:
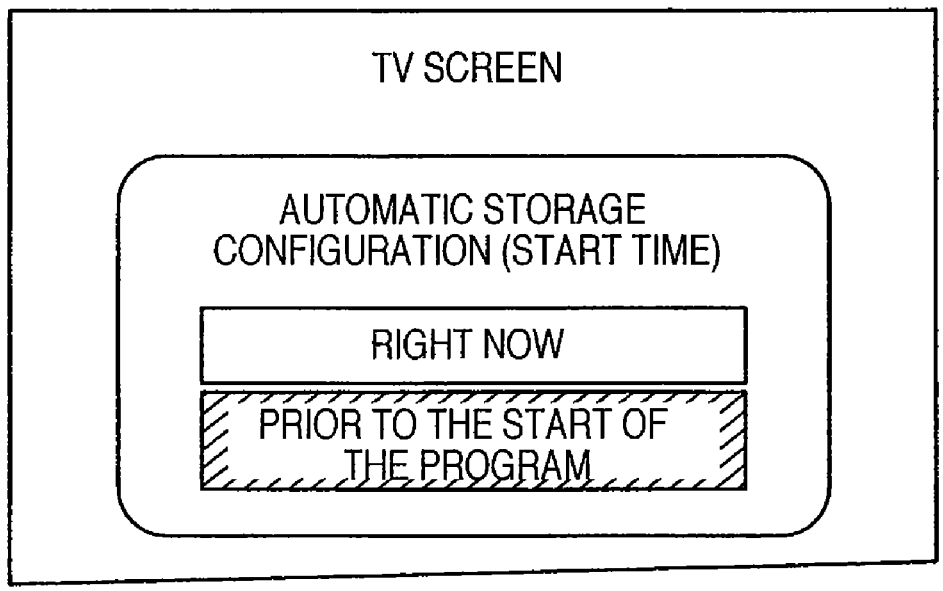
FIG. 14 is a diagram illustrating an exemplary automatic storage configuration screen presented by the recording/playback control unit 1004 in S7011 of FIG. 12.
Figure 15:
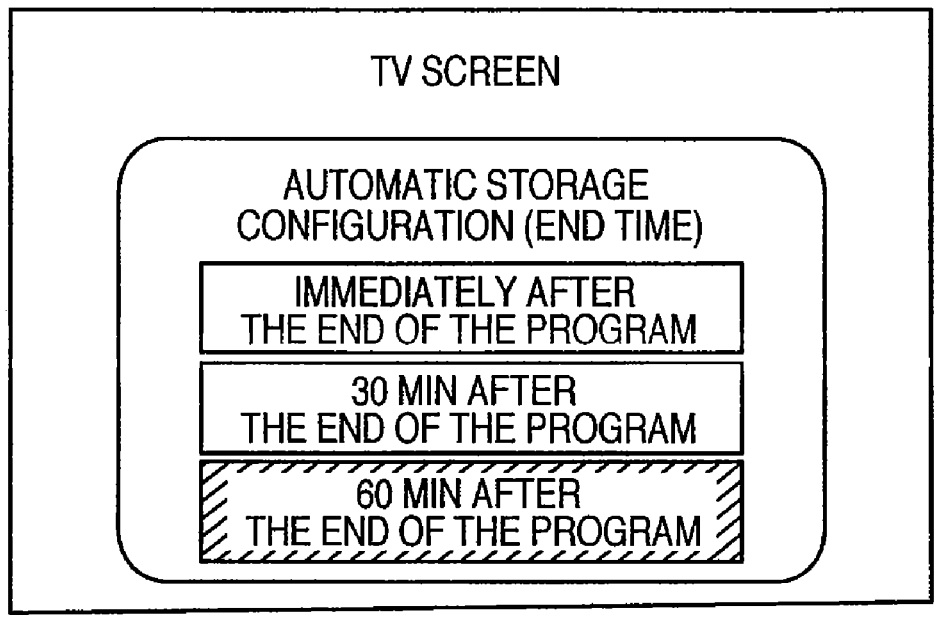
FIG. 15 is a diagram illustrating an exemplary automatic storage configuration screen presented by the recording/playback control unit 1004 in S7011 of FIG. 12.
Figure 16:
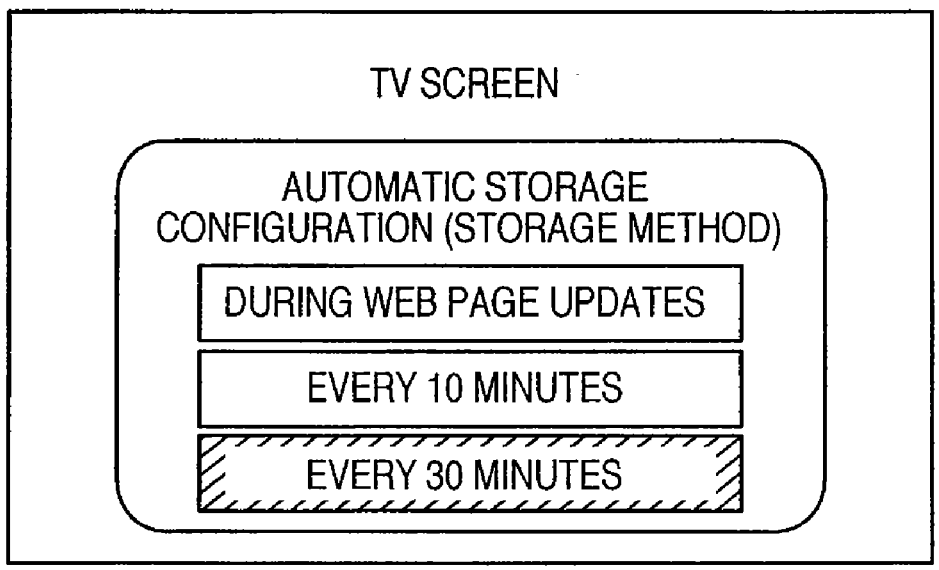
FIG. 16 is a diagram illustrating an exemplary automatic update configuration screen presented by the recording/playback control unit 1004 in S7011 of FIG. 12.

FIG. 14 to FIG. 16 illustrate an exemplary automatic storage configuration screen displayed by the recording/playback control unit 1004 in S7011. In this example, the recording/playback control unit 1004 first presents the user with an automatic storage start time configuration screen to allow the user to select the start time (FIG. 14). In the example of FIG. 14, the setting of the start time can be used to determine whether storage is to start immediately or prior to the start of the program (e.g. several tens of seconds to several minutes prior thereto).

Next, the recording/playback control unit 1004 presents the user with an automatic storage end time configuration screen to allow the user to select the end time (FIG. 15). In the example of FIG. 15, the setting of the end time can be used to determine whether recording is to end immediately after the end of the program or a predetermined period of time after the end (e.g. 30 min to 60 min). Therefore, the time period between the start time and end time is the time period, during which the operation of automatic storage is carried out. Furthermore, during the automatic storage operation, the recording/playback control unit 1004 presents the user with a screen (FIG. 16) used for configuring the conditions or method of the storage operation and lets the user determine how it should be performed. In the example of FIG. 16, it is possible to configure whether storage is to be carried out whenever an associated Web page is updated or at predetermined intervals (10 min or 30 min).

In S7011, when the configuration of automatic storage of Web page content information is over, the recording/playback control unit 1004 saves the recording schedule configuration information and information on the Web page content information storage schedule and terminates the record-scheduling operation.

In the present embodiment, in addition to the address information of the stored Web pages, the storage schedule information comprises information related to automatic storage (storage start time, storage end time, and automatic storage method). In addition, at such time, the recording/playback control unit 1004 adds new correspondence information to the correspondence information list of the correspondence information holding unit 1005.

FIG. 17 illustrates an exemplary correspondence information list used in the second embodiment.

In the present embodiment, the recorded-program information has the same format as the recorded-program information contained in the correspondence information in the first embodiment illustrated in FIG. 3. On the other hand, the stored Web page information has a format, in which the automatic storage method and automatic storage frequency is added to the stored Web page information used in the first embodiment. The automatic storage frequency, whose initial value is zero, is counted consecutively whenever there is an update to the Web page content information. Moreover, whenever Web page content information is stored and then the storage of information is repeated again, the time and date of storage, as well as the storage locations, are added (in FIG. 17, segments denoted Content 1, Content 2, . . . are added at the time of storage). Therefore, for each correspondence information, the length of the stored Web page information is variable and can be controlled based on the automatic update frequency. It should be noted that when the same program is allowed to have links to more than one associated Web pages in the first embodiment, the length of each correspondence information can be varied.

(Recording Operation and Web Page Content Information Collection Operation)

Figure 18:
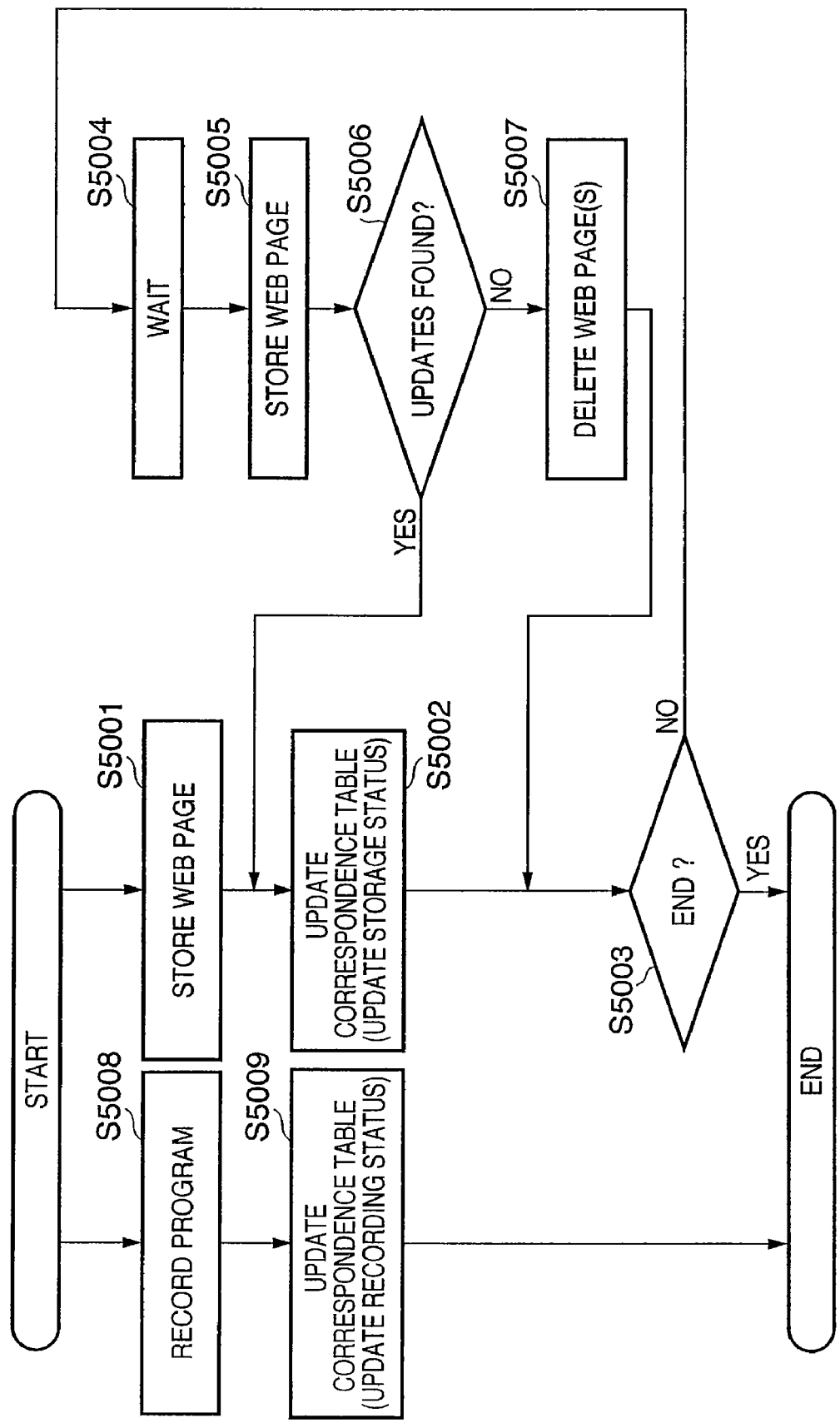
FIG. 18 is a flow chart for illustrating the operations of Web page storage and execution of scheduled program recording by the TV receiver 1000 according to the second embodiment of the present invention.

FIG. 18 is a flow chart for illustrating the operations of Web page storage and execution of scheduled program recording in the TV receiver 1000 according to the second embodiment.

The processing procedure illustrated here relates to a case, in which, during the above-mentioned record-scheduling operation, the automatic storage method is set to "during Web page updates", the storage start time to "prior to the start of the program", and the storage end time to "immediately after the end of the program".

Using the storage schedule information and the calendar clock, not shown, etc., the recording/playback control unit 1004 detects the arrival of the storage start time (here, immediately prior to the start of the program). Then, based on the address information (URLs) contained in the storage schedule information, the recording/playback control unit 1004 issues a request to the communication unit 1009 for acquisition of the content information of the associated Web pages corresponding to the URLs. The communication unit 1009 accesses the Web server 2000 that holds the Web page content information and acquires the Web page content information. Subsequently, the communication unit 1009 stores the acquired Web page content information in the Web page storage unit 1006 (S5001).

After storing the Web page content information, the Web page storage unit 1006 accesses the correspondence information list maintained by the correspondence information holding unit 1005 and updates the data of the correspondence information corresponding to the stored Web page content information (S5002). Specifically, a "Content 1" column is added along with incrementing the "Update Frequency" in the stored Web page information by one. The "Content 1" column lists the storage location in the Web page storage unit 1006 and the time, at which the operation of storage is executed.

On the other hand, upon the arrival of the recording start time described in the recording schedule configuration information, the recording/playback control unit 1004 requests that the TV receiver unit 1001, decoding unit 1010, and external I/F unit 1008, respectively, record the program described in the recording schedule configuration information (S5008). Upon receipt of the program, the TV receiver unit 1001 converts it to TS data and forwards it to the decoding unit 1010. The decoding unit 1010 uses the TS data received from the TV receiver unit 1001 to generate partial TS data in the above-described manner. The external I/F unit 1008 outputs the partial TS data to the corresponding equipment intended for recording (TV program recorder 3000), as described in the recording schedule configuration information. The TV program recorder 3000 records the partial TS data on a DVD, HDD, or another storage medium in a predetermined format.

The recording/playback control unit 1004 continues the operation of storage of Web page content information along with the operation of program recording of S5008. First of all, the recording/playback control unit 1004 makes a determination as to the termination/continuation of the storage operation (S5003).

Specifically, the recording/playback control unit 1004 accesses the correspondence information list held in the correspondence information holding unit 1005 and checks the "automatic storage" method. Here, if the method is set to the option "do not perform", the value of the storage status in the correspondence information is changed from "scheduled" to "completed", and the operation of Web page content information storage is then terminated. In addition, the recording/playback control unit 1004 simultaneously checks whether the operation of recording of S5008 has ended. Here, if the recording operation has ended, the recording/playback control unit 1004 changes the value of the storage status in the correspondence information from "scheduled" to "completed" and terminates the operation of storage of Web page content information.

If the "automatic storage" method is set to the option "during Web page updates", the recording/playback control unit 1004 enters a standby mode for a predetermined period of time (S5004). As used herein, the term "predetermined period of time" refers to a time period, during which a Web page does not get updated more than once, for instance, several seconds or so.

After remaining in the standby mode for the predetermined period of time, the recording/playback control unit 1004 stores the Web page content information from the Web server 2000 in the Web page storage unit 1006 via the communication unit 1009 (S5005).

Subsequently, the recording/playback control unit 1004 performs a differential comparison between the Web page content information stored the previous time and the Web page content information stored this time in order to check whether the Web page content information has been updated (S5006). It is possible to check for such an update, for instance, by comparing the text of the HTML documents comprised in the content information in order to check whether there have been any changes made to their contents, or by checking whether there have been any changes in the amount of data contained in the acquired Web page content information.

If it is determined in S5006 that there have been no updates, the recording/playback control unit 1004 deletes the Web page content information stored in the Web page storage unit 1006 in S5004 (S5007) and proceeds to S5003 once again.

Alternatively, the following method is contemplated as a method used by the recording/playback control unit 1004 to check for updates to the Web page content information. The recording/playback control unit 1004 uses HTTP (HyperText Transfer Protocol) to access the Web server 2000 via the communication unit 1009. Thus, the recording/playback control unit 1004 acquires Web content update date and time information etc. as part of an HTTP request message.

Specifically, information on the timing of the latest update to a Web page can be acquired using the "Last-Modified", which is contained in the header of the main body of an HTTP message. The recording/playback control unit 1004 compares the acquired latest update timing information with the latest update timing information of the already acquired Web page content information. If the results of the comparison show that the timing information coincides, it is determined that there have been no updates to the Web page, and no Web page content information is acquired. Moreover, if the results of the comparison show that the timing information does not match, it is determined that the content of the Web page has been updated and control is exercised to acquire Web page content information via the communication unit 1009. In other words, in Step S5006, the determination as to the presence or absence of updates can be carried out without acquiring the content (actual files) of the Web pages.

If it is determined in S5006 that an update has taken place, the recording/playback control unit 1004 goes back to S5002 and updates the correspondence table. Here, specifically, a "Content 2" column is added along with incrementing the "Update Frequency" by one. The "Content 2" column lists the storage time and storage location related to the Web page content information stored in S5004.

When the recording of the program in S5008 is over, the recording/playback control unit 1004 updates the data of the correspondence information corresponding to the recorded program. In other words, it changes the value of the recording status in the correspondence information from "scheduled" to "completed" (S5009).

On the other hand, the recording/playback control unit 1004 continues to perform the operation of automatic storage of S5002 to S5007 until the arrival of the preset storage end time. Depending on the storage end time, the operation of automatic storage may end prior to the operation of recording, as well as subsequent thereto.

(Playback Operation)

FIG. 19 is a flow chart for illustrating the operation of playback in the TV receiver according to the second embodiment of the present invention.

Steps involving operations identical to the playback operation of the first embodiment illustrated in FIG. 10 are assigned the same reference numerals and the corresponding explanations are omitted. As evidenced by comparison of FIG. 19 and FIG. 10, the operation of playback in the present embodiment is characterized by the addition of operations S6007 to S6011 subsequent to S3006, in which the stored Web pages are displayed during the playback operation of the first embodiment.

Accordingly, the explanations below apply to the operations starting from S6007.

In S6006, upon receipt of a request from the recording/playback control unit 1004 to display stored associated Web pages, the Web browser 1003 uses the content information of the associated Web pages stored in the Web page storage unit 1006 to generate GUI data used for browsing. It then displays the stored associated Web pages on the monitor 4000 via the superimposing unit 1007.

In the present embodiment, multiple content information is stored for the same Web page at different acquisition times. For this reason, the Web browser 1003 uses the playback position (elapsed time) within the recorded program at the moment when the display request is received in order to select a Web page appropriate for that playback position from among the multiple stored Web pages and displays that page. If more than one Web page content information is stored, the display is switched between the multiple Web pages depending on the elapsed time. The method of Web page selection is described below.

When the Web browser 1003 displays Web pages, the recording/playback control unit 1004 monitors the playback position within the recorded program (S6007). If the playback of the program ends at this point, the recording/playback control unit 1004 starts a timer, not shown (S6008).

Next, the recording/playback control unit 1004 determines the presence or absence of new Web page content information to be displayed based on the playback position within the program or, in case the playback of the program has ended, based on the numerical value of the timer (S6009). Here, if there is no Web page content information to be displayed, the apparatus waits for user instructions to terminate Web browsing and, when the instructions arrive, the playback operation is terminated.

If there is Web page content information to be displayed, the recording/playback control unit 1004 determines whether to display this Web page content information (S6010). The method of determination is described below.

If it is determined in S6010 that the information is not to be displayed, the recording/playback control unit 1004 returns processing control to S6007 and starts monitoring the playback position within the program once again. If it is determined in S6010 that the stored Web page content should be displayed, the recording/playback control unit 1004 issues a request to the Web browser 1003 to display the Web page content information subsequent to the currently displayed Web page content information. Upon receipt of the request, the Web browser 1003 selects Web page content information suitable for being displayed next and displays it (S6011).

FIG. 20A and FIG. 20B are diagrams explaining the relationship between the timing of storage of the content of associated Web pages during recording and the associated Web pages displayed during the playback of the recorded program in the present embodiment. The method used to select associated Web page content information in S6006 and S6011 and the method of determining the way the display is to be switched in S6010 are explained below with reference to FIG. 20A and FIG. 20B.

In FIG. 20A and FIG. 20B, the recorded program is designated as "Program a" and the stored associated Web page content information as "Associated Web Page Content Information b". FIG. 20A illustrates the relationship between the recording period of Program a and the timing of storage of the Associated Web Page Content Information b. In addition, FIG. 20B illustrates the relationship between the passage of playback time of the recorded Program a and the displayed Associated Web Page Content Information b. In both cases, the time is plotted along the X-axis, with the origin of the time axes aligned so as to make the relationship between the recording time and playback time easier to understand.

Referring now to the recording and storage operations illustrated in FIG. 20A, the initial timing of storage of the Associated Web Page Content Information b is immediately prior to the start of Program a. The Associated Web Page Content Information b stored at this moment is stored in the Web page storage unit 1006 as Content 1.

Subsequently, after the start of recording of Program a, the Associated Web Page Content Information b is stored for a second time (D302). This information is stored in the Web page storage unit 1006 as Content 2. Subsequently, when the recording of Program a is over, the final storage of the Associated Web Page Content Information b is carried out (D303). This information is stored in the Web page storage unit 1006 as Content 3. The details of the operational flow of recording (storage) up to this point have already been explained using FIG. 18 and therefore no detailed explanations are provided here.

Next, let us examine the playback operation of FIG. 20B. It is assumed that an instruction to browse (stored) associated Web pages has been issued by the user at a certain moment in time during the playback of the recorded program (D304). Because the closest storage timing point prior to this timing is D301, the recording/playback control unit 1004 instructs the Web browser 1003 to display Content 1 (which corresponds to Step S3006).

Subsequently, the playback of Program a continues and, upon arrival of the timing point D305, which corresponds to the timing point D302 used for storing Content 2, the recording/playback control unit 1004 automatically (or manually) switches the Associated Web Page Content Information b to be displayed from Content 1 to Content 2 (which corresponds to Step S6011).

This timing point D305 is synchronous with the timing point D302, at which Content 2 was stored during the recording of Program a. For this reason, when the arrival of the same timing point as the timing point used during storage is detected using the time elapsed from the beginning of the program, it can be determined that the display of the Web page content information must be switched to the next segment of content information.

Specifically, for each content storage timing point used during recording, a difference between the program start time shown in FIG. 17 and the date and time of storage is obtained and converted to time elapsed since the start of the program. After that, the arrival of the timing point, at which the display of content needs to be switched, is determined by comparing the results of this calculation with the elapsed time (time elapsed since the start of the program) of the program during playback.

Therefore, if the storage timing of Content 2 is after elapsing time t1 from the start of the program, in S6011, the display is switched to Content 2 after detecting, in S6010, that time t1 has passed since the start of the program during playback.

Subsequently, in the same manner, the Associated Web Page Content Information b to be displayed is automatically (or manually) switched from Content 2 to Content 3 at the timing point D306 after termination of playback of Program a. The timing point D306 is also synchronous with the storage timing point D303 of Content 3.

As explained above, the second embodiment, in addition to effects similar to those of the first embodiment, makes it possible to acquire and store the same associated Web page content information more than once at different timing points. In addition, stored associated Web pages are presented at appropriate timing points during playback depending on the duration of playback.

In particular, if automatic storage is carried out after updating of the associated Web pages, the content of the associated Web pages is displayed during playback in updated form and at the same timing points as during the broadcast. Therefore, the user can enjoy the recorded program in the same manner as when it was viewed during the broadcast.

It should be noted that while explanations in the present embodiment are provided on the assumption that the associated Web page content information is switched and displayed automatically during playback, it may be possible to configure whether to switch and display the information automatically or to switch and display it manually based on user instructions. If it is switched and displayed manually, it may be sufficient, for instance, to present a GUI inquiring whether the display is to be switched when the time arrives to switch the display, and to switch it to the next Web page content information segment only when there is a corresponding instruction.

Third Embodiment

The content information of the associated Web pages stored in the Web page storage unit 1006 in the first embodiment and second embodiment can be stored in the TV program recorder 3000 by multiplexing it with the same partial TS data as that of the recorded program.

In the present embodiment, such a configuration is explained in comparison with the first embodiment.

Figure 21:
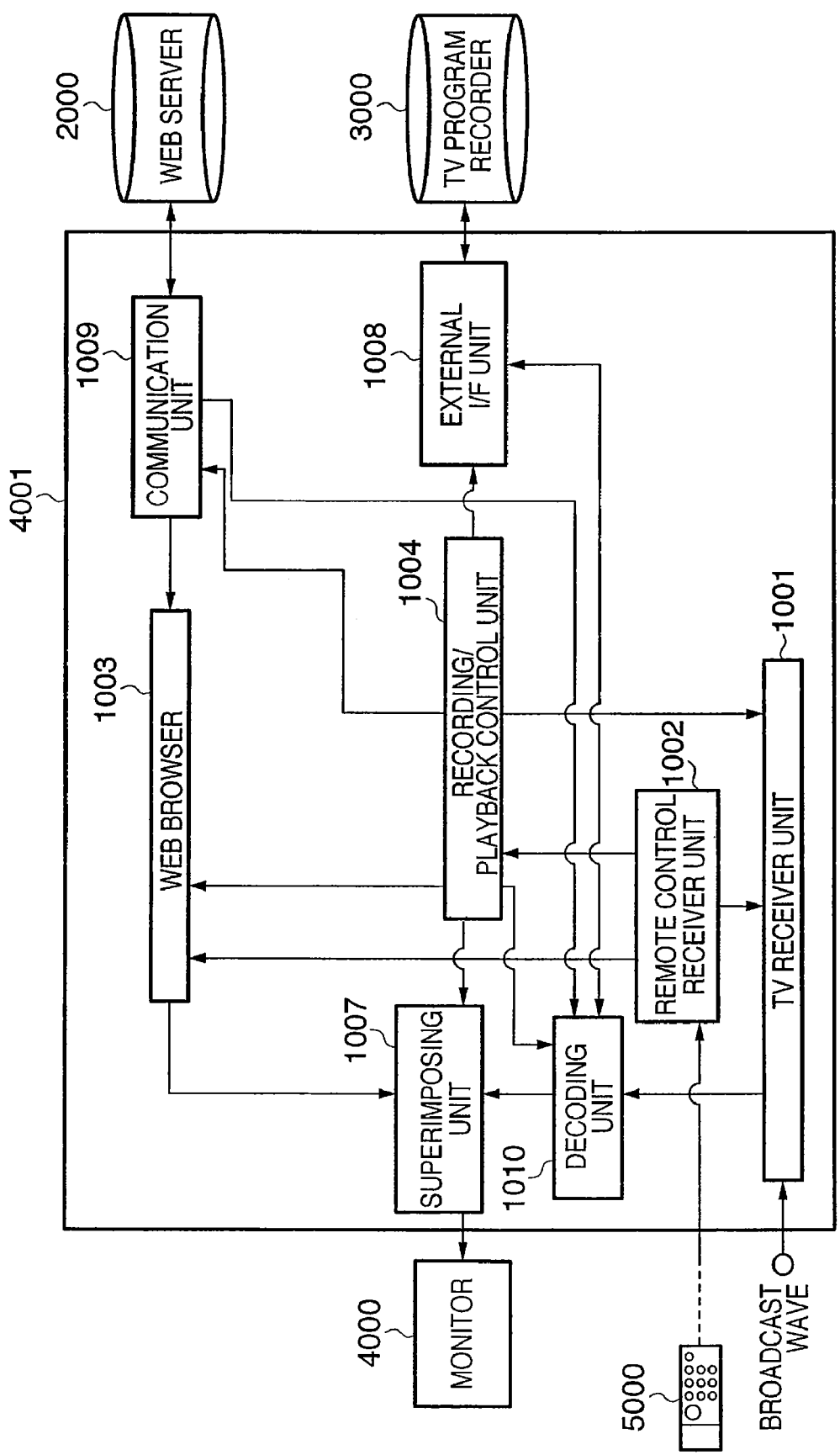
FIG. 21 is a diagram illustrating an exemplary configuration of a TV receiver 4001 representing an example of the content storage control apparatus used in a third embodiment of the present invention, as well as the associated external devices.

FIG. 21 is a diagram illustrating an exemplary configuration of a TV receiver 4001 representing an example of the content storage control apparatus used in a third embodiment, as well as the associated external devices.

The difference from FIG. 1 is that the Web page storage unit 1006 and correspondence information holding unit 1005 are eliminated, with the rest of the configuration being the same as in FIG. 1. However, in this embodiment, the communication unit 1009 can pass the content information of the associated Web pages acquired from the Web server 2000 to the decoding unit 1010.

Because the operation of program record scheduling in the third embodiment is the same as in the first embodiment (FIG. 4), detailed explanations are omitted.

(Recording Operation & Web Page Content Information Collection Operation)

Figure 22:
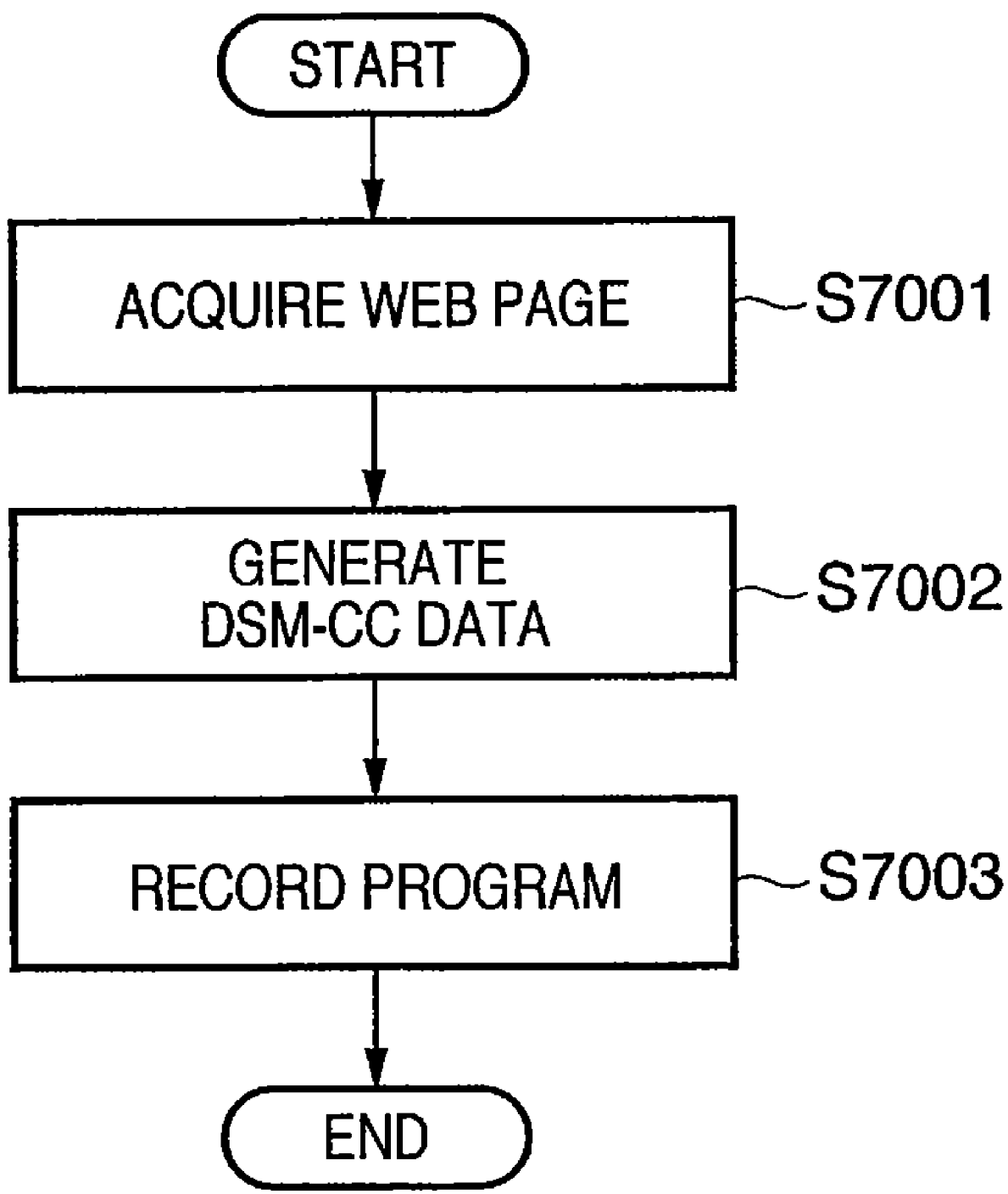
FIG. 22 is a flow chart for illustrating the operations of Web page storage and execution of scheduled program recording in the TV receiver according to the third embodiment of the present invention.

FIG. 22 is a flow chart for illustrating the operations of Web page storage and execution of scheduled program recording in the TV receiver according to the third embodiment of the present invention.

It should be noted that FIG. 22 illustrates a processing procedure used when the timing of Web page storage during the record scheduling operation is set to "immediately prior to the start of the program". Based on the storage time indicated in the storage schedule information, the recording/playback control unit 1004 detects the arrival of the storage time (a predetermined period of time prior to the start time of the program scheduled for recording). The recording/playback control unit 1004 then issues a request to the communication unit 1009 for acquisition of the content information of Web pages corresponding to the address information contained in the storage schedule information. In response to this request, the communication unit 1009 accesses the Web server 2000, which holds the content information of the associated Web pages, and performs the acquisition of the content information of the associated Web pages (S7001). The communication unit 1009 then passes the acquired content information of the associated Web pages to the decoding unit 1010.

The decoding unit 1010 generates DSM-CC (Digital Storage Media Command and Control) data from the received content information of the associated Web pages (S7002). It is in a data format used for data broadcasts in modern digital broadcasting.

FIG. 23A to FIG. 23D are diagrams schematically illustrating a procedure whereby the decoding unit 1010 produces DSM-CC data from the received content information and stores it in the partial TS data.

While files of various types and sizes may be present in the content information constituting a Web page, in FIG. 23A, the content information is composed of HTML document data, PNG data, and JPEG data. First of all, the decoding unit 1010 reassembles these data files into units called modules. A module is composed of one or more data files (FIG. 23B). Subsequently, the decoding unit 1010 generates DSM-CC data from the generated modules (FIG. 23C). The DSM-CC data is composed of DDB (DownloadDataBlock) data and DII (DownloadInfoIndication) data. The DDB data is obtained by splitting the module into fixed-length data items.

The DII data contain module-related information. The information contained in the DII data includes information used for identifying DDBs that make up the module, version information for the DDBs, etc.

The DSM-CC data is generated from the associated Web page content information based on the procedure above. The generated DSM-CC data is temporarily stored, for instance, in the internal storage device of the decoding unit 1010, not shown. Without going into particulars at this point, the operation of DSM-CC data generation is carried out in a similar manner at other storage timing points as well.

Subsequently, upon the arrival of the recording start time indicated in the recording schedule configuration information, the recording/playback control unit 1004 requests that the TV receiver unit 1001, decoding unit 1010, and external I/F unit 1008, respectively, record the program described in the recording schedule configuration information (S7003). Upon receipt of the program, the TV receiver unit 1001 converts it to TS data and forwards it to the decoding unit 1010. The decoding unit 1010 uses the TS data received from the TV receiver unit 1001 to generate partial TS data in the above-described manner. The external I/F unit 1008 outputs the partial TS data to the corresponding equipment intended for recording (TV program recorder 3000), as described in the recording schedule configuration information. Moreover, at such time, the decoding unit 1010 turns the DSM-CC data stored in the internal storage device into TS packets and stores them in the partial TS data (FIG. 23D). In addition, the decoding unit 1010 repeatedly stores the same DSM-CC data at a certain periodicity. This delivery method, which is the same as a data broadcast used in digital broadcasting, is called "data carousel".

Moreover, to distinguish the data of a data broadcast from the content information of the associated Web pages, the decoding unit 1010 adds information used for identification to the PMT included in the partial TS data.

Figure 24:
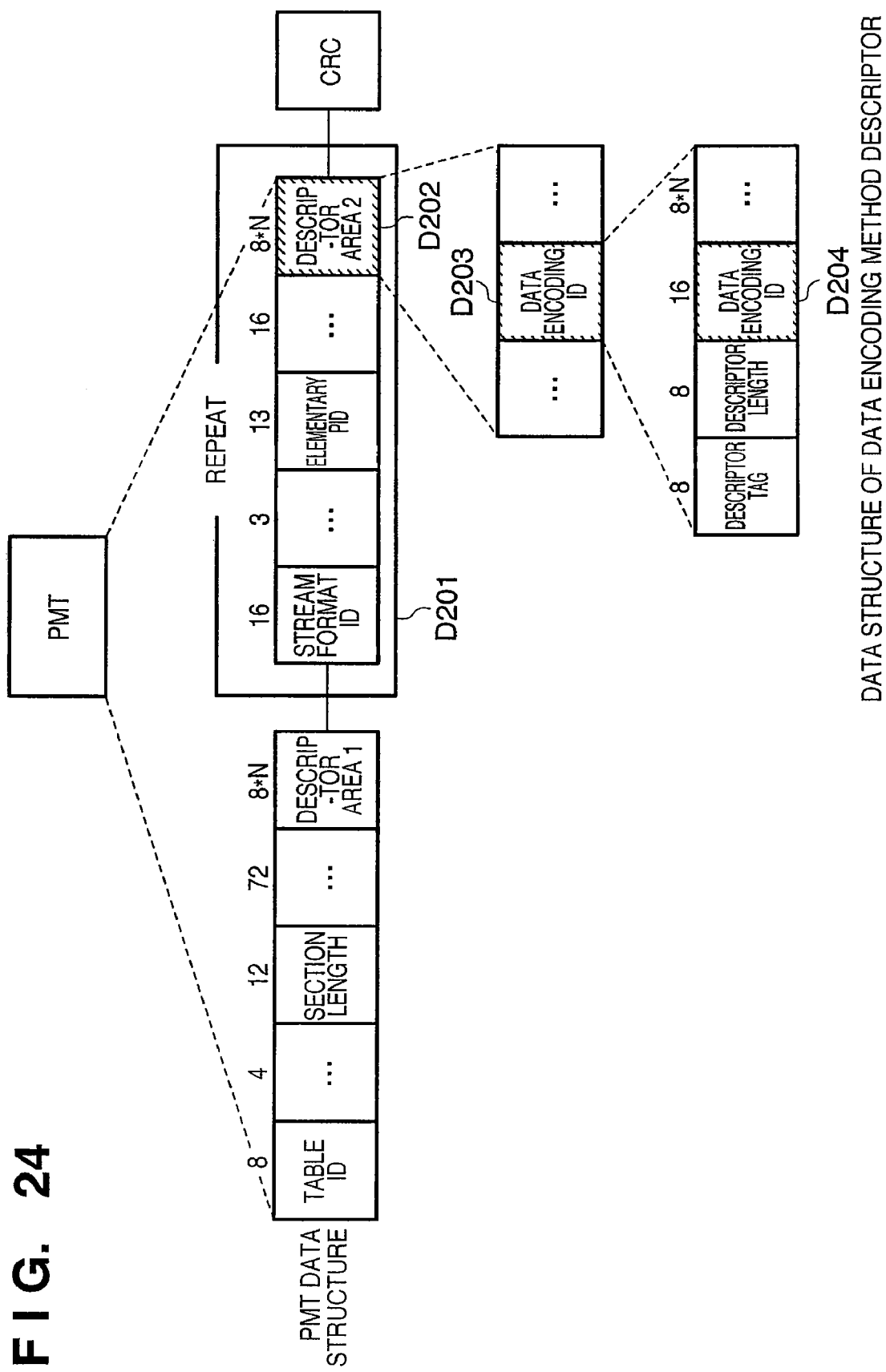
FIG. 24 illustrates the data structure of a PMT contained in the partial TS data outputted by the decoding unit 1010 in the third embodiment of the present invention.

FIG. 24 illustrates the data structure of the PMT included in the partial TS data output by the decoding unit 1010 in the present embodiment.

The PMT contains map information for data (data broadcast data, etc.) and streams (video, audio, captions, etc.) contained in the partial TS data, with the respective information of each stream and each data item stored in the segment designated as D201. For instance, in case of a video stream, IDs (elementary PIDs) used for identifying video packets, as well as copy control-related information, etc., are stored in D201. Here, if information related to Web page content information is recorded in D201, a data encoding descriptor (D203) must be contained in the descriptor area of D202.

Furthermore, a value different from the currently employed value is assigned to the value of the data encoding method identification information (D204) of the data encoding identification. Because the data encoding method identification information may be contained in the data of data broadcasts and captions, it is assigned a value different from that of the data encoding method identification information allocated thereto to provide a distinction.

The TV program recorder 3000 records the partial TS data on a DVD, HDD, or another storage medium in a predetermined format.

(Playback Operation)

Figure 25:
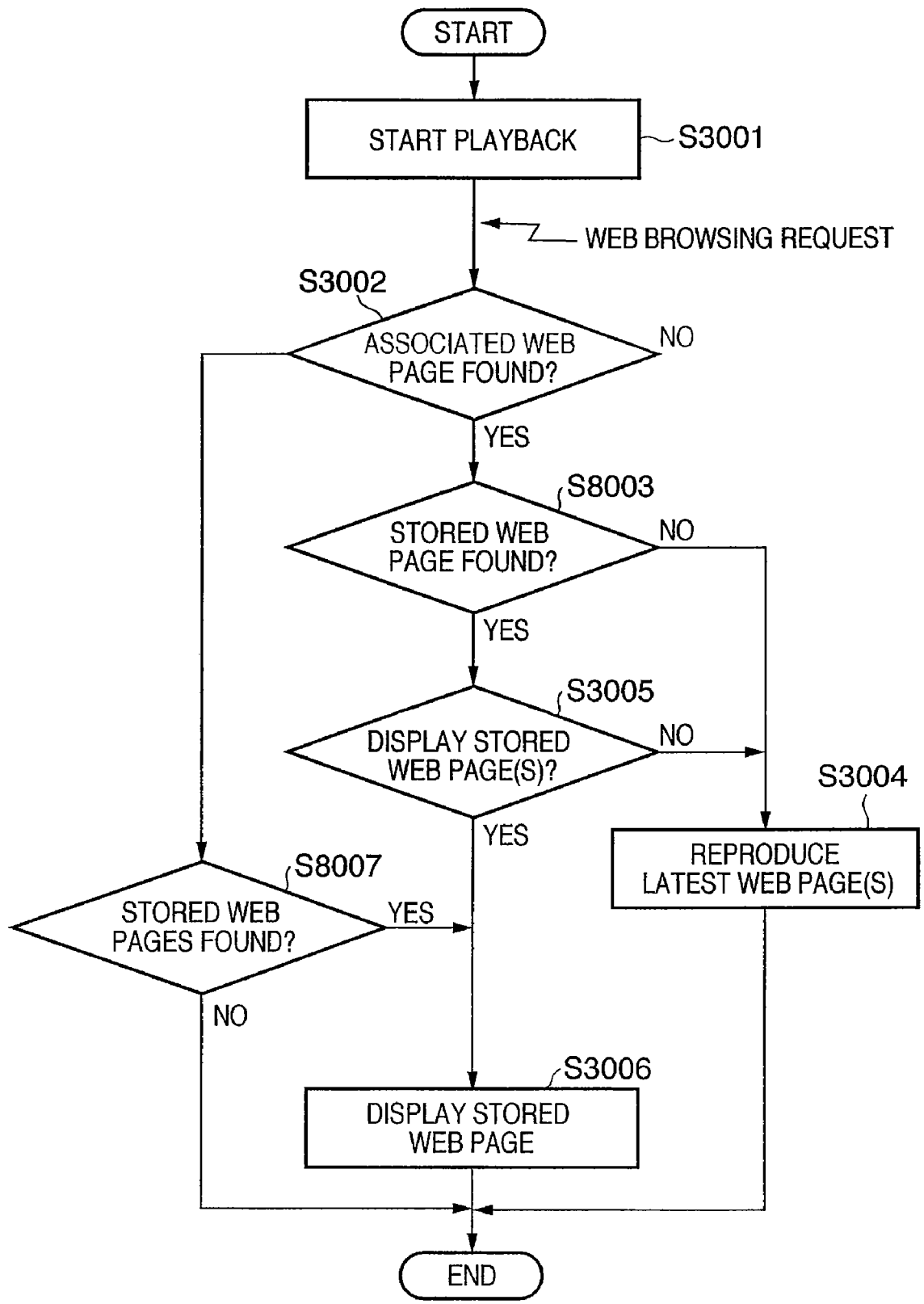
FIG. 25 is a flow chart for illustrating the operation of playback in the TV receiver according to the third embodiment of the present invention.

FIG. 25 is a flow chart for illustrating the operation of playback in the TV receiver according to the third embodiment of the present invention.

Steps involving operations identical to the playback operation of the first embodiment illustrated in FIG. 10 are assigned the same reference numerals and the corresponding explanations are omitted. Below, explanations are provided only with regard to operations performed in Steps S8003 and S8007, which are characteristic of the present embodiment.

If the recording/playback control unit 1004 receives remote control information with a request to browse associated Web pages during the playback of the recorded program, it checks for the presence or absence of Web pages associated with the recorded program being played back (S3002). Specifically, the recording/playback control unit 1004 uses the recorded program-related information communicated by the decoding unit 1010 to check for the presence or absence of associated Web pages by searching the information stored in the internal memory.

If there are associated Web pages, the recording/playback control unit 1004, via the decoding unit 1010, checks whether Web page content information related to the present program is stored in the partial TS data received from the TV program recorder 3000 (S8003). The confirmation operation involves identifying the value of the data encoding method identification information stored in the PMT in the partial TS data. If it is confirmed that the value of the data encoding method identification information corresponds to associated Web page content information, the recording/playback control unit 1004 determines that Web page content information related to the present program is stored in the partial TS data and executes the operation of S3005. If there are no data encoding method identification values corresponding to Web page content information, the recording/playback control unit 1004 determines that no Web page content information is stored therein and executes the operation of S3004.

Moreover, even if no associated Web pages are found in S3002, in S8007, the recording/playback control unit 1004 carries out the same confirmation processing as in S8003. If, as a result of confirmation, it is determined that Web page content information related to the present program is stored in the partial TS data, the recording/playback control unit 1004 displays it in S3006. If it is determined in S8007 that no Web page content information is stored therein, the recording/playback control unit 1004 terminates the processing as is.

It should be noted that the operations performed in S8003 and S8007 do not have to be carried out in response to Web page browsing requests from the user, and data may be displayed spontaneously at any point in time after the start of playback of the recorded program in S3001.

As described above, the third embodiment makes it possible to simplify the configuration of the TV receiver 4001 because the content information of the associated Web pages is multiplexed with the program data and stored in the TV program recorder 3000. Moreover, since the content of the associated Web pages is multiplexed with the program data, the associated Web pages can still be browsed even if the TV program recorder 3000 is connected to a TV receiver 4001 different from the one used during program recording. In this manner, the reusability of the stored associated Web page content information can be increased.

It should be noted that the configuration of the present embodiment can also be combined with the second embodiment.

If it is combined with the second embodiment, it is sufficient to make sure that different Web page content information can be stored in the same partial TS data. Specifically, the associated Web page content information of Content 1 is repeatedly stored during the period between the timing points D301 and D302 in FIG. 20A. The associated Web page content information of Content 2 is repeatedly stored between the timing point D302 until D303.

Moreover, information used during playback to detect the timing point, at which the type of the associated Web page content is changed, is also stored in the PMT or in the DSM-CC data of the associated Web page content information during recording. In the latter case, it is possible to use, for instance, a data_event_id in the DII data of the DSM-CC data. The same data_event_id value is used between the timing points D301 and D302, and the data_event_id value is changed (e.g. increased) when switching to Content 2.

During playback, changes in the contents (update timing) of the associated Web pages can be determined by monitoring the data_event_id value in the partial TS data.

Fourth Embodiment

In the above-described embodiments, explanations were provided regarding configurations, in which the TV program recorder 3000 was a different device than the TV receivers 1000 and 4001. However, the same features as those of the TV program recorder 3000 may be incorporated into the TV receivers 1000 and 4001.

Figure 26:
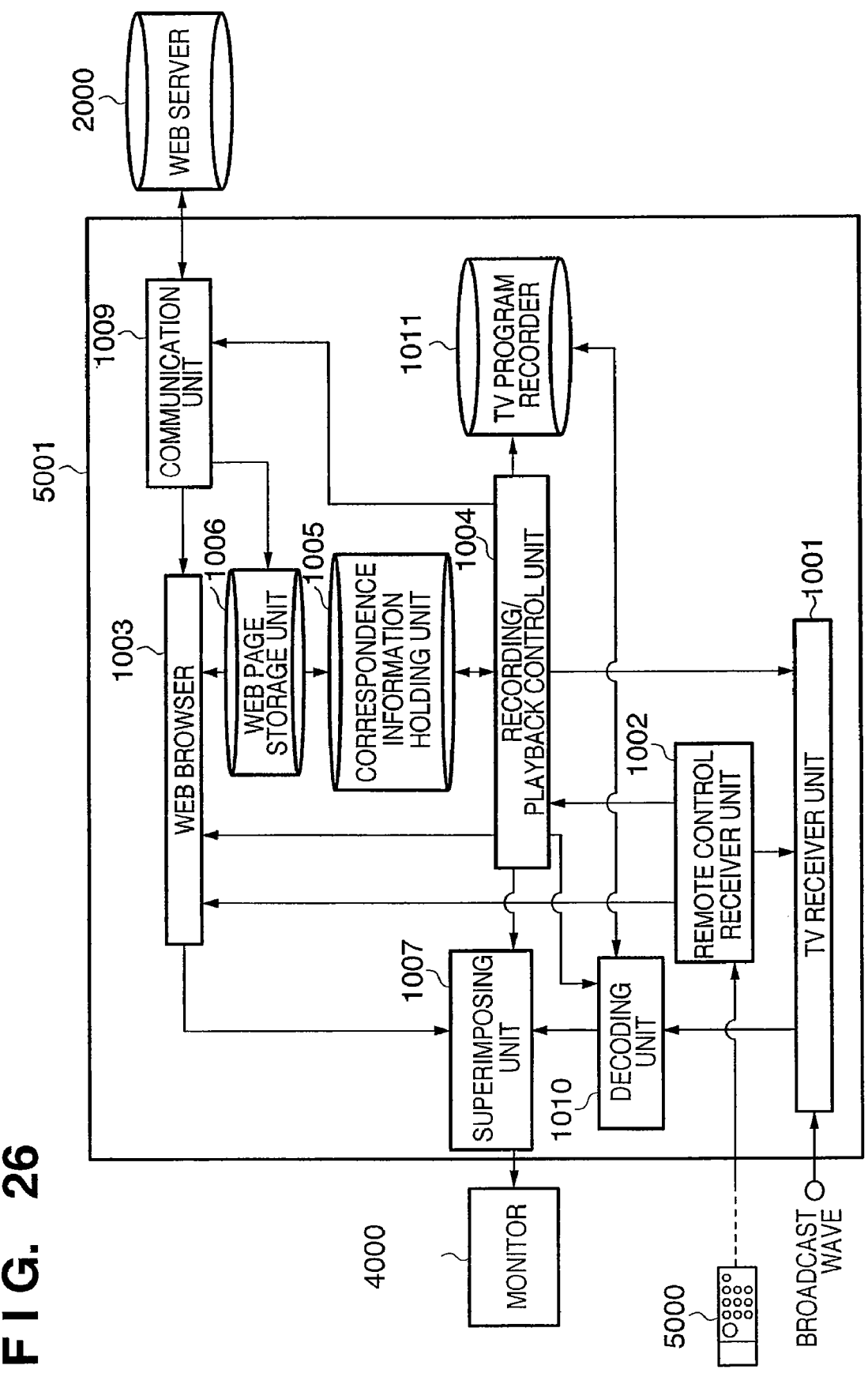
FIG. 26 is a diagram illustrating an exemplary configuration of a TV receiver 5001 representing an example of the content storage control apparatus used in a fourth embodiment of the present invention.

FIG. 26 is a diagram illustrating an exemplary configuration of a TV receiver 5001 representing an example of the content storage control apparatus used in a fourth embodiment of the present invention. In FIG. 26, the same reference numerals are applied to the same components as in FIG. 1.

As is evidenced by comparison of FIG. 26 and FIG. 1, in the configuration of the present embodiment, the difference is that the apparatus has a built-in TV program recorder unit 1011 possessing a recording feature similar to that of the TV program recorder 3000, and the external I/F unit 1008 is eliminated.

In addition, the recording/playback control unit 1004 and decoding unit 1010 used in the present embodiment exercise control over, as well as pass data to/from, the TV program recorder unit 1011.

With the exception of the fact that the recording and reading of program data is carried out by the TV program recorder unit 1011 instead of the TV program recorder 3000, in the present embodiment, the same operations can be performed as those carried out by the TV receivers 1000 and 4001 in the above-described first embodiment through fourth embodiment and, therefore, the corresponding explanations of these operations are omitted.

In the present embodiment, it becomes possible to implement the features of the above-described embodiments using a single TV receiver.

Other Embodiments

Although the explanation of the above-described embodiments implied scheduled recording, the operations of storage of associated Web page content information and displaying the associated Web pages during playback can be performed in the same manner if a recording instruction is issued when the program is broadcast.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-289198, filed on Oct. 24, 2006, and No. 2007-208476, filed on Aug. 9, 2007, which are hereby incorporated by reference herein in their entirety.

What is claimed is:

1. A content storage control apparatus comprising:
a content acquiring unit configured to be capable of accessing a designated Web page and acquiring the content information of the Web page from a Web server;
a confirmation unit configured to check for the presence of an associated Web page URL associated with a broadcast program;
an output unit configured to output the data of the broadcast program to a recording apparatus during the broadcast program is being broadcast; and
a control unit configured to use, in case the associated Web page URL is present, the content acquiring unit to acquire the content information of the associated Web page corresponding to the associated Web page URL and store the acquired content information in a storage unit in association with the broadcast program;
a playback unit configured to acquire the data of a recorded broadcast program from the recording apparatus, play back the broadcast program using the acquired data, and output it to a display; and
a Web page output unit configured to read the content information of the associated Web page that corresponds to the associated Web page URL associated with the broadcast program, from the storage unit and output the associated Web page to the display,
wherein the confirmation unit, during the output of the data of the broadcast program to the recording apparatus, acquires update timing information of the associated Web page from the Web server that stores the associated Web page and determines whether the associated Web page that is stored the Web server has been updated, by comparing the acquired update timing information with a latest update timing information of the associated Web page that has already been acquired, and
wherein the control unit, if the result of the comparison shows that the acquired update timing information and the latest update timing information do not match, determines that the associated Web page has been updated and acquires the content information of the updated associated Web page from the Web server by using the content acquiring unit, and stores the content information of the updated associated Web page in the storage unit in association with the broadcast program, and
wherein the control unit allows to a user to choose whether to output the associated Web page stored in the storage unit when the content information of the associated Web page associated with the broadcast program is present, or to acquire the content information of the associated Web page by the content acquiring unit using the associated Web page URL and output the acquired associated Web page.

2. The content storage control apparatus according to claim 1, wherein the control unit presents a selection screen that allows a user to choose whether to store the content information of the updated associated Web page in the storage unit in association with the broadcast program when it is determined that the associated Web page has been updated or to store the content information of the associated Web page in the storage unit in association with the broadcast program at a predetermined timing.

3. The content storage control apparatus according to claim 1, wherein the recording apparatus also serves as the storage unit and wherein the control unit controls the output unit to multiplex the content information of the associated Web page with the data of the broadcast program and output them to the recording apparatus.

4. The content storage control apparatus according to claim 1, wherein, in case where a plurality pieces of content information of the associated Web page are associated with the broadcast program, the control unit, based on an elapsed time of the broadcast program played back by the playback unit and a timing point at which the plurality of content information is stored, selects one of the plurality pieces of content information and directs the Web page output unit to output the selected content information, and
wherein the control unit, when a predetermined time has elapsed after the playback of the broadcast program ends, determines if content information to be displayed subsequent to the content information being output by the Web page output unit exist based on the timing point at which the plurality of content information is stored, and, if it is determined that no content information is to be displayed subsequent to the content information being output by the Web page output unit exists, waits for use instructions to terminate the browsing of the Web page.

5. The content storage control apparatus according to claim 4, wherein the control unit selects content information stored at a timing point corresponding to a time closest to the elapsed time and earlier than the elapsed time.

6. The content storage control apparatus according to claim 5, wherein, as the elapsed time progresses, the control unit successively and automatically switches the content to be output by the Web page output unit.

7. A method for controlling a content storage control apparatus comprising:
a content acquisition step of accessing designated Web page to permit acquisition of the content information on the Web page from a Web server;
a confirmation step of checking for the presence of an associated Web page URL associated with a broadcast program;
an output step of outputting the data of the broadcast program to a recording apparatus during the broadcast program is being broadcast; and
a control step of acquiring, in case the associated Web page URL is present, the content information of the associated Web page corresponding to the associated Web page URL in the content acquisition step and storing the acquired content information in a storage unit in association with the broadcast program;
a playback step of acquire the data of a recorded broadcast program from the recording apparatus, play back the broadcast program using the acquired data, and output it to a display; and
a Web page output step to read the content information of the associated Web page that corresponds to the associated Web page URL associated with the broadcast program, from the storage unit and output the associated Web page to the display,
wherein in the confirmation step, during the output of the data of the broadcast program to the recording apparatus, it acquires update timing information of the associated Web page from the Web server that stores the associated Web page and is determined whether the associated Web page that is stored the Web server has been updated, by comparing the acquired update timing information with a latest update timing information of the associated Web page that has already been acquired, and
wherein the control unit, if the result of the comparison shows that the acquired update timing information and the latest update timing information do not match, determines that the associated Web page has been updated and acquires the content information of the updated associated Web page from the Web server by using the content acquiring unit, and the content information of the updated associated Web page is stored in the storage unit in association with the broadcast program, and wherein the control step allows to a user to choose whether to output the associated Web page stored in the storage unit when the content information of the associated Web page associated with the broadcast program is present, or to acquire the content information of the associated Web page by the content acquisition step using the associated Web page URL and output the acquired associated Web page.

8. The method for controlling a content storage control apparatus according to claim 7, wherein, in the control step, a selection screen is presented that allows a user to choose whether to store the content information of the updated associated Web page in the storage unit in association with the broadcast program when it is determined that the associated Web page has been updated or to store the content information of the associated Web page in the storage unit in association with the broadcast program at predetermined timing.

9. The method for controlling a content storage control apparatus according to claim 7, wherein the recording apparatus also serves as the storage unit and wherein the control step controls the output step in such a manner that the content information of the associated Web page is multiplexed with the data of the broadcast program and output to the recording apparatus.

10. The method for controlling a content storage control apparatus according to claim 7, wherein in the control step, in case where a plurality pieces of content information of the associated Web page are associated with the broadcast program, an elapsed time of the broadcast program played back in the playback step and a timing point at which the plurality of content information is stored, are used to select one of the plurality pieces of content information and output the selected content information in the Web page output step, and wherein the control step, when a predetermined time has elapsed after the playback of the broadcast program ends, determines if content information to be displayed subsequent to the content information being output by the Web page output step exist based on the timing point at which the plurality of content information is stored, and, if it is determined that no content information is to be displayed subsequent to the content information being output by the Web page output step exists, waits for use instructions to terminate the browsing of the Web page.

11. The method for controlling a content storage control apparatus according to claim 10, wherein, in the control step, content information is selected that is stored at a timing point corresponding to a time closest to the elapsed time and earlier than the elapsed time.

12. The method for controlling a content storage control apparatus according to claim 11, wherein in the control step, the content that is outputted in the Web page output step is successively and automatically switched as the elapsed time progresses.

* * * * *